(12) United States Patent
Li

(10) Patent No.: US 11,302,313 B2
(45) Date of Patent: Apr. 12, 2022

(54) SYSTEMS AND METHODS FOR SPEECH RECOGNITION

(71) Applicant: BEIJING DIDI INFINITY TECHNOLOGY AND DEVELOPMENT CO., LTD., Beijing (CN)

(72) Inventor: Xiulin Li, Tianjin (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 156 days.

(21) Appl. No.: 16/714,710

(22) Filed: Dec. 14, 2019

(65) Prior Publication Data

US 2020/0118551 A1 Apr. 16, 2020

Related U.S. Application Data

(63) Continuation of application No. PCT/CN2018/091430, filed on Jun. 15, 2018.

(30) Foreign Application Priority Data

Jun. 15, 2017 (CN) .......................... 201710451642.7
Jun. 20, 2017 (CN) .......................... 201710469290.8

(51) Int. Cl.
*G10L 15/08* (2006.01)
*G10L 15/06* (2013.01)
*G10L 15/22* (2006.01)

(52) U.S. Cl.
CPC ............ *G10L 15/08* (2013.01); *G10L 15/063* (2013.01); *G10L 15/22* (2013.01)

(58) Field of Classification Search
CPC ........ G10L 15/063; G10L 15/08; G10L 15/22
See application file for complete search history.

(56) References Cited

U.S. PATENT DOCUMENTS 6,735,565 B2  5/2004  Gschwendtner
7,228,275 B1  6/2007  Endo et al.
(Continued)

FOREIGN PATENT DOCUMENTS

CN  102063901 A  5/2011
CN  102110362 A  6/2011
(Continued)

OTHER PUBLICATIONS

International Search Report in PCT/CN2018/091430 dated Sep. 17, 2018, 4 pages.
(Continued)

*Primary Examiner* — Michael Colucci
(74) *Attorney, Agent, or Firm* — Metis IP LLC

(57) ABSTRACT

Systems and methods for speech recognition are provided. The method may include obtaining a plurality of candidate recognition results of speech information uttered by a user and a plurality of preliminary scores corresponding to the plurality of candidate recognition results, respectively. The method may further include, for each of the plurality of candidate recognition results, extracting one or more keywords from the candidate recognition result and determining at least one parameter associated with the one or more extracted keywords. The method may further include, for each of the plurality of candidate recognition results, generating an updating coefficient based on the at least one parameter and updating the preliminary score based on the updating coefficient to generate an updated score. The method may further include determining, from the plurality of candidate recognition results, a target recognition result based on the plurality of updated scores.

19 Claims, 10 Drawing Sheets

(56) References Cited

U.S. PATENT DOCUMENTS

| | | | |
|---|---|---|---|
| 2006/0095263 | A1 | 5/2006 | Kawasaki et al. |
| 2011/0060587 | A1* | 3/2011 | Phillips .................. G10L 15/30 704/235 |
| 2011/0131039 | A1 | 6/2011 | Kroeker et al. |
| 2011/0196678 | A1* | 8/2011 | Hanazawa ......... G10L 15/1807 704/251 |
| 2012/0010873 | A1 | 1/2012 | Kim et al. |
| 2012/0041756 | A1 | 2/2012 | Hanazawa et al. |
| 2013/0024448 | A1* | 1/2013 | Herbrich ............... G06F 16/951 707/728 |
| 2014/0136109 | A1 | 5/2014 | Sumiyoshi et al. |
| 2014/0156278 | A1 | 6/2014 | Kennewick et al. |
| 2015/0051912 | A1 | 2/2015 | Wang et al. |
| 2015/0255064 | A1 | 9/2015 | Fujii et al. |
| 2015/0269939 | A1 | 9/2015 | Gruchalski et al. |
| 2015/0302847 | A1* | 10/2015 | Yun ......................... G10L 15/02 704/251 |
| 2015/0359468 | A1 | 12/2015 | Bochner et al. |
| 2017/0025124 | A1* | 1/2017 | Mixter ................... G10L 15/22 |
| 2017/0084278 | A1 | 3/2017 | Jung |
| 2017/0125011 | A1 | 5/2017 | Shu |

FOREIGN PATENT DOCUMENTS

| | | |
|---|---|---|
| CN | 103020098 A | 4/2013 |
| CN | 103677729 A | 3/2014 |
| CN | 104166645 A | 11/2014 |
| CN | 104836720 A | 8/2015 |
| CN | 105447019 A | 3/2016 |
| CN | 105448292 A | 3/2016 |
| CN | 105702252 A | 6/2016 |
| CN | 105931642 A | 9/2016 |
| CN | 106128462 A | 11/2016 |
| CN | 106205613 A | 12/2016 |
| CN | 106448675 A | 2/2017 |
| CN | 106776763 A | 5/2017 |
| CN | 106776900 A | 5/2017 |
| CN | 106847288 A | 6/2017 |
| JP | 2011118290 A | 6/2011 |
| JP | 2012079309 A | 4/2012 |
| TW | 201207847 A1 | 2/2012 |
| TW | 201426736 A | 7/2014 |

OTHER PUBLICATIONS

Written Opinion in PCT/CN2018/091430 dated Sep. 17, 2018, 4 pages.

First Office Action in Chinese Application No. 201710469290.8 dated Dec. 31, 2019, 18 pages.

First Office Action in Chinese Application No. 201710451642.7 dated Mar. 2, 2020, 11 pages.

The Second Office Action in Chinese Application No. 201710469290.8 dated Sep. 23, 2020, 26 pages.

The Third Office Action in Chinese Application No. 201710469290.8 dated Jan. 20, 2021, 25 pages.

Zhang, Lin et al., A Question Answering System in Natural Language About Shanghai Traffic Route, Journal of South China University of Technology (Natural Science Edition), 32: 32-36, 2004.

* cited by examiner

SYSTEMS AND METHODS FOR SPEECH RECOGNITION

CROSS-REFERENCE TO RELATED APPLICATIONS

This application is a continuation of International Application No. PCT/CN2018/091430, filed on Jun. 15, 2018, which designates the United States of America and claims priority to Chinese Patent Application No. 201710451642.7, filed on Jun. 15, 2017, and Chinese Patent Application No. 201710469290.8, filed on Jun. 20, 2017, the entire contents of each of which are hereby incorporated by reference.

TECHNICAL FIELD

The present disclosure generally relates to speech information processing, and in particular, to methods and systems for speech recognition.

BACKGROUND

With the development of computer technologies, human-computer interaction is becoming increasingly popular. The basic requirement of the human-computer interaction is that the computer should understand the information that the users provide. Along with the developments of acoustic model and speech recognition techniques (such as the Automatic Speech Recognition (ASR) technology), speech information is usually preferred by the users for interacting with the computer due to its convenience. However, the present speech recognition method is usually a single-round recognition and converts speech information into only one possible recognition result. In other words, the same speech information provided by different people in different scenarios may be recognized as the same result and only match the real intent of one or few people. For example, the speech information of "I want to order a high table" may be recognized as an instruction of purchasing a particular table while a user is actually aiming to book a formal dinner in a restaurant. The mistaken recognition result of purchasing a table is usually not corrected and directly displayed to the person. The person may have to rephrase his words several times before the computer can accurately understand his/her meaning. Such experience of using the present speech recognition method is neither easy nor pleasant. Thus, it is desirable to provide systems and methods for recognizing speech information more accurately and more efficiently.

SUMMARY

According to an aspect of the present disclosure, a method for speech recognition is provided. The method may be implemented on a computing device having at least one storage device storing a set of instructions for speech recognition, a data exchange port communicatively connected to a network, and at least one processor in communication with the at least one storage device and the data exchange port. The method may include obtaining a plurality of candidate recognition results of speech information uttered by a user and a plurality of preliminary scores corresponding to the plurality of candidate recognition results, respectively. The method may further include, for each of the plurality of candidate recognition results, extracting one or more keywords from the candidate recognition result and determining at least one parameter associated with the one or more extracted keywords. The method may further include, for each of the plurality of candidate recognition results, generating an updating coefficient based on the at least one parameter and updating the preliminary score based on the updating coefficient to generate an updated score. The method may further include determining a target recognition result based on the plurality of updated scores from the plurality of candidate recognition results.

In some embodiments, the determining at least one parameter associated with the one or more extracted keywords may include obtaining a plurality of sample keywords from a database via the data exchange port. For each of the one or more extracted keywords, the determining at least one parameter associated with the one or more extracted keywords may further include determining a matching degree between each of the one or more extracted keywords and each of the plurality of sample keywords, and determining one or more target sample keywords from the plurality of sample keywords, wherein the matching degree between the each of the one or more target sample keywords and the extracted keyword may be higher than a matching degree threshold. The determining at least one parameter associated with the one or more extracted keywords may further include determining the at least one parameter associated with the one or more extracted keywords based on the one or more target sample keywords.

In some embodiments, the at least one parameter may include a search parameter, and the determining the at least one parameter associated with the one or more extracted keywords based on the one or more target sample keywords may include determining the search parameter based on the matching degrees between the one or more target sample keywords and one or more extracted keywords.

In some embodiments, the at least one parameter may include a popularity parameter, and the determining the at least one parameter associated with the one or more extracted keywords based on the one or more target sample keywords may include obtaining popularity degrees of the one or more target sample keywords and determining the popularity parameter based on the popularity degrees of the one or more target sample keywords.

In some embodiments, the at least one parameter may include a preference parameter, and the determining the at least one parameter associated with the one or more extracted keywords based on the one or more target sample keywords may include obtaining preference degrees of the user with respect to the one or more target sample keywords and determining the preference parameter based on the preference degrees of the one or more target sample keywords.

In some embodiments, the at least one parameter may include a distance parameter, the determining the at least one parameter associated with the one or more extracted keywords based on the one or more target sample keywords may include obtaining location information associated with the one or more target sample keywords and identifying one or more location type indicating words in the candidate recognition result. For each of the one or more extracted keywords that is immediately after the one or more identified location type indicating words, the determining the at least one parameter associated with the one or more extracted keywords based on the one or more target sample keywords may further include determining a location type of the extracted keyword based on the corresponding location type indicating word, and determining distance information associated with the one or more extracted keywords based on the location information associated with the one or more target sample keywords and the location type of each of the one or more extracted keywords. The determining the at least one parameter associated with the one or more extracted keywords based on the one or more target sample keywords may further include determining the distance parameter based on the distance information.

In some embodiments, the method further include obtaining a first number of travels corresponding to the distance information associated with each of at least one travel means in a statistical time period and determining a second number of travels corresponding to the distance information associated with all of the at least one travel means in the statistical time period. The method may further include, for each of the at least one travel means, determining a probability of using the travel means based on the first number of travels and the second number of travels and obtaining a travel means associated with the speech information. The method may further include determining the distance parameter based on the probability of using the travel means associated with the speech information.

In some embodiments, the at least one parameter may include at least one of a popularity parameter, a preference parameter, a search parameter, or a distance parameter. The generating an updating coefficient based on the at least one parameter may include generating the updating coefficient based on the popularity parameter, the preference parameter and the search parameter, or generating the updating coefficient based on the distance parameter and the search parameter.

In some embodiments, the target recognition result may include a start location or a destination, and the method may further include generating a service request based on the target recognition result.

In some embodiments, the method may further include transmitting the service request to a user terminal associated with a service provider.

According to another aspect of the present disclosure, a system for speech recognition is provided. The system may include at least one storage device including a set of instructions, a data exchange port communicatively connected to a network, and at least one processor in communication with the at least one storage device and the data exchange port. The at least one processor may be configured to execute the set of instructions and directed to cause the system to obtain a plurality of candidate recognition results of speech information uttered by a user and a plurality of preliminary scores corresponding to the plurality of candidate recognition results, respectively. The at least one processor may be further directed to cause the system to, for each of the plurality of candidate recognition results, extract one or more keywords from the candidate recognition result, determine at least one parameter associated with the one or more extracted keywords, generate an updating coefficient based on the at least one parameter, and update the preliminary score based on the updating coefficient to generate an updated score. The at least one processor may be further directed to cause the system to determine, from the plurality of candidate recognition results, a target recognition result based on the plurality of updated scores.

According to another aspect of the present disclosure, a non-transitory computer readable medium is provided. The non-transitory computer readable medium may include a set of instructions for speech recognition. When executed by at least one processor, the set of instructions may direct the at least one processor to effectuate a method. The method may include obtaining a plurality of candidate recognition results of speech information uttered by a user and a plurality of preliminary scores corresponding to the plurality of candidate recognition results, respectively. The method may further include, for each of the plurality of candidate recognition results, extracting one or more keywords from the candidate recognition result, determining at least one parameter associated with the one or more extracted keywords, generating an updating coefficient based on the at least one parameter, and updating the preliminary score based on the updating coefficient to generate an updated score. The method may further include determining, from the plurality of candidate recognition results, a target recognition result based on the plurality of updated scores.

According to another aspect of the present disclosure, a method for speech recognition is provided. The method may be implemented on a computing device having at least one storage device storing a set of instructions for speech recognition, and at least one processor in communication with the at least one storage device. The method may include obtaining a plurality of candidate recognition results of speech information provided by a current user and a plurality of preliminary scores, wherein each of the plurality of preliminary scores corresponds to one of the candidate recognition results. The method may further include extracting one or more keywords of a predetermined type from each of the plurality of candidate recognition results based on a predetermined keyword extracting rule. The method may further include modifying the preliminary score corresponding to the each of the plurality of candidate recognition results based on the one or more extracted keywords, and determining, based on a result of the modification, a target recognition result of the speech information.

In some embodiments, the modifying the preliminary score corresponding to the each of the plurality of candidate recognition results based on the one or more extracted keywords may include determining an updating coefficient for the each of the plurality of candidate recognition results having the one or more extracted keywords based on a similarity between the one or more extracted keywords and a plurality of sample keywords in a predetermined sample database. The modifying the preliminary score corresponding to the each of the plurality of candidate recognition results based on the one or more extracted keywords may further include updating the preliminary score corresponding to the each of the plurality of candidate recognition results based on the updating coefficient to generate an updated score corresponding to the each of the plurality of candidate recognition results.

In some embodiments, the predetermined sample database may further include at least one of popularity information of the plurality of sample keywords or historical information of using the plurality of sample keywords by the current user.

In some embodiments, the predetermined sample database may further include the popularity information of the plurality of sample keywords. The determining an updating coefficient for the each of the plurality of candidate recognition results having the one or more extracted keywords based on a similarity between the one or more extracted keywords and a plurality of sample keywords in a predetermined sample database may include determining a similarity between the one or more extracted keywords and the plurality of sample keywords, selecting one or more sample keywords from the plurality of sample keywords, converting the popularity information of the selected one or more sample keywords to one or more popularity parameters according to a first conversion relationship between popularity information and popularity parameters, and determining, based on the one or more popularity parameters, the updating coefficient of the each of the plurality of candidate recognition results having the one or more extracted keywords. The similarity between the one or more extracted keywords and the one or more selected sample keywords may be greater than a similarity threshold.

In some embodiments, the popularity information of the plurality of sample keywords may include a plurality of popularity degrees of the plurality of sample keywords corresponding to a plurality of periodical statistical time periods. The converting the popularity information of the selected one or more sample keywords to one or more popularity parameters according to a first conversion relationship between popularity information and popularity parameters may include determining a statistical time period that a current time belongs to, selecting, from the plurality of popularity degrees of the one or more selected sample keywords corresponding to the plurality of periodical statistical time periods, one or more popularity degrees corresponding to the statistical time period, and converting the one or more popularity degrees to the one or more popularity parameter of the each of the plurality of candidate recognition results according to a second conversion relationship between popularity degrees and popularity parameters.

In some embodiments, the predetermined sample database may further include the popularity information of the plurality of sample keywords and the historical information of using the plurality of sample keywords by the current user. The determining an updating coefficient for the each of the plurality of candidate recognition results having the one or more extracted keywords based on a similarity between the one or more extracted keywords and a plurality of sample keywords in a predetermined sample database may include determining a similarity between the one or more extracted keywords and the plurality of sample keywords, converting the similarity to a search parameter according to a third conversion relationship between similarities and search parameters, converting the similarity to a preference parameter according to a fourth conversion relationship between similarities and preference parameters, and determining a popularity parameter based on the similarity, the popularity information of the plurality of sample keywords, and a first conversion relationship between popularity information and popularity parameters. The determining an updating coefficient for the each of the plurality of candidate recognition results having the one or more extracted keywords based on a similarity between the one or more extracted keywords and a plurality of sample keywords in a predetermined sample database may further include determining the updating coefficient of the each of the plurality of candidate recognition results having the one or more extracted keywords by adding the search parameter to, or multiplying the search parameter by, a higher value between the preference parameter and the popularity parameter. For a same similarity, the preference parameter converted according to the fourth conversion relationship between similarities and preference parameters may be greater than the popularity parameter determined based on the first conversion relationship between popularity information and popularity parameters.

According to another aspect of the present disclosure, a device for speech recognition is provided. The device may include at least one storage device including a set of instructions, and at least one processor in communication with the at least one storage device. The at least one processor may be configured to execute the set of instructions. The at least one processor may include an information acquisition module, configured to obtain a plurality of candidate results of speech information provided by a current user and a plurality of preliminary scores, wherein each of the plurality of preliminary scores corresponds to one of the candidate recognition results. The at least one processor may further include an information extraction module configured to extract one or more keywords of a predetermined type from each of the plurality of candidate recognition results based on a predetermined keyword extracting rule. The at least one processor may further include a result determination module, configured to modify the preliminary score corresponding to the each of the plurality of candidate recognition results based on the one or more extracted keywords, and determine, based on a result of the modification, a target recognition result of the speech information.

According to another aspect of the present disclosure, a non-transitory computer readable medium is provided. The non-transitory computer readable medium may include a set of instructions for speech recognition. When executed by at least one processor, the set of instructions may direct the at least one processor to effectuate a method. The method may include obtaining a plurality of candidate recognition results of speech information provided by a current user and a plurality of preliminary scores, wherein each of the plurality of preliminary scores corresponds to one of the candidate recognition results. The method may also include extracting one or more keywords of a predetermined type from each of the plurality of candidate recognition results based on a predetermined keyword extracting rule. The method may also include modifying the preliminary score corresponding to the each of the plurality of candidate recognition results based on the one or more extracted keywords, and determining, based on a result of the modification, a target recognition result of the speech information.

According to another aspect of the present disclosure, a method for speech recognition in transportation services is provided. The method may be implemented on a computing device having at least one storage device storing a set of instructions for speech recognition in transportation services and at least one processor in communication with the at least one storage device. The method may include receiving and analyzing speech information to generate a plurality of candidate recognition results of the speech information and a plurality of preliminary scores. Each of the plurality of preliminary scores may correspond to one of the plurality of candidate recognition results, extracting information of at least one location from the each of the plurality of candidate recognition results. The method may further include searching a database for one or more points of interest (POIs) that match with each of the at least one location, and determining a first parameter of the each of the plurality of candidate recognition results based on a result of matching between the searched one or more POIs and the each of the at least one location. The method may further include determining a location type of the each of the at least one location in the each of the plurality of candidate recognition results, and determining a second parameter of the each of the plurality of candidate recognition results based on the location type. The method may further include determining an updated score corresponding to the each of the plurality of candidate recognition results based on the preliminary score corresponding to the each of the plurality of identification results, the first parameter and the second parameter. The method may further include determining a highest updated score among a plurality of updated scores corresponding to the plurality of candidate recognition results, and outputting a recognition result corresponding to the highest updated score.

In some embodiments, the searching a database for one or more POIs that match with each of the at least one location, and determining a first parameter of the each of the plurality of candidate recognition results based on a result of matching between the searched one or more POIs and the each of the at least one location may include: when a POI that matches with the at least one location is found in the database, determining the first parameter of the recognition result as 1; when no POI that matches with the at least one location is found in the database, determining a matching degree between each of the one or more POIs in the database and the at least one location; when the matching degree between the each of the one or more POIs and the at least one location is less than or equal to a first matching degree threshold, determining the first parameter of the recognition result as 0; and when the matching degree between the each of the one or more POIs and the at least one location is greater than the first matching degree threshold, determining the first parameter of the recognition result based on the matching degree, wherein the first parameter of the recognition result may be proportional to the matching degree.

In some embodiments, the determining a location type of the each of the at least one location corresponding to the each of the plurality of candidate recognition results may include determining whether the recognition result may include start location information before the information of the at least one location. The determining a location type of the each of the at least one location corresponding to the each of the plurality of candidate recognition results may include, in response to a determination that the recognition result does not include start location information before the information of any of the at least one location, determining position information associated with the speech information as the start location. The determining a location type of the each of the at least one location corresponding to the each of the plurality of candidate recognition results may include, in response to a determination that the recognition result may include start location information before the information of the at least one location, searching the database for a first POI that matches with the at least one location and determining a first location corresponding to the first POI as the start location; or searching the database for a plurality of second POIs, determining a second location corresponding to the each of the plurality of second POIs, and determining a first average location based on the second locations corresponding to the plurality of second POIs as the start location. A matching degree between each of the plurality of second POIs and the at least one location may be greater than a second matching degree threshold.

In some embodiments, the determining a location type of the each of the at least one location corresponding to the each of the plurality of candidate recognition results further may further include determining whether the recognition result may include destination information before the information of the at least one location. The determining a location type of the each of the at least one location corresponding to the each of the plurality of candidate recognition results further may further include, in response to a determination that the recognition result does not include destination information before the information of any of the at least one location, generating a notification for notifying users to provide the destination information. The determining a location type of the each of the at least one location corresponding to the each of the plurality of candidate recognition results further may further include, in response to a determination that the recognition result may include destination information before the information of the at least one location, searching the database for a third POI that matches with the information of the at least one location, and determining a third location corresponding to the third POI as the destination; or searching the database for a plurality of fourth POIs, determining a fourth location corresponding to the each of the plurality of fourth POIs, and determining a second average location based on the fourth locations corresponding to the plurality of fourth POIs as the destination. A matching degree between each of the plurality of fourth POIs and the at least one location may be greater than a third matching degree threshold.

In some embodiments, the determining the second parameter of the each of the plurality of candidate recognition results based on the location type may include determining distance information from the start location to the destination for the each of the plurality of candidate recognition results, determining at least one travel means corresponding to the distance information, determining a number of travels corresponding to the distance information for each of the at least one travel means in a statistical time period, determining a usage probability for each of the at least one travel means based on the number of travels corresponding to the each of the at least one travel means and a total number of travels in the statistical time period, and determining the usage probability as the second parameter.

In some embodiments, the method may further include correlating a name relating to each POI with a location corresponding to the POI, and storing the correlation into the database.

In some embodiments, a computing device is provided. The computing device may include at least one storage device storing a set of instructions and at least one processor in communication with the at least one storage device. When executing the set of instructions, the at least one processor may be directed to implement the method described above.

In some embodiments, a non-transitory computer readable medium is provided. The non-transitory computer readable medium may include a set of instructions for speech recognition. When executing the set of instructions, the at least one processor may be directed to implement the method described above.

According to another aspect of the present disclosure, a system for speech recognition in transportation services is provided. The system may include at least one storage device including a set of instructions and at least one processor in communication with the at least one storage device. The at least one processor may be configured to execute the set of instructions. The at least one processor may include a preliminary score determination module configured to receive and analyze speech information to generate a plurality of candidate recognition results of the speech information and a plurality of preliminary scores, wherein each of the plurality of preliminary scores corresponds to one of the plurality of candidate recognition results. The at least one processor may further include an extraction module, configured to extract information of at least one location from the each of the plurality of candidate recognition results. The at least one processor may further include a first parameter assignment module configured to search a database for one or more point of interests (POIs) that match with each of the at least one location, and determining a first parameter of the each of the plurality of candidate recognition results based on a result of matching between the searched one or more POIs and the each of the at least one location. The at least one processor may further include a second parameter assignment module configured to determine a location type of the each of the at least one location in the each of the plurality of candidate recognition results, and determining a second parameter of the each of the plurality of candidate recognition results based on the location type. The at least one processor may further include a modification module configured to determine an updated score corresponding to the each of the plurality of candidate recognition results based on the first parameter and the second parameter. The at least one processor may further include an output module configured to determine a highest updated score among a plurality of updated scores corresponding to the plurality of candidate recognition results, and output a recognition result corresponding to the highest updated score.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
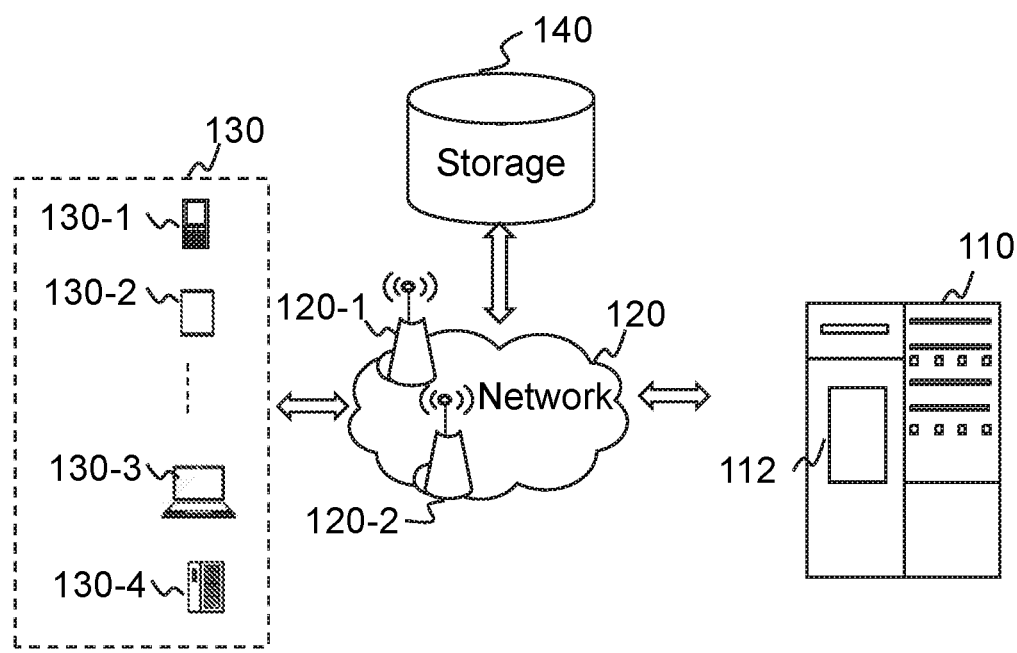
FIG. 1 is a schematic diagram of an exemplary speech recognition system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding speech recognition in transportation services, it should also be understood that this is only one exemplary embodiment. The system or method of the present disclosure may be applied to user of any other kind of scenarios that requires speech information to be recognized. For example, the system or method of the present disclosure may be applied to an E-business service, an online shopping service, a voice controlling system, or the like, or any combination thereof. The application scenarios of the system or method of the present disclosure may include a webpage, a plug-in of a browser, a client terminal, a custom system, an internal analysis system, an artificial intelligence robot, or the like, or any combination thereof.

The start location for transportation services in the present disclosure may be acquired by positioning technology embedded in a wireless device (e.g., a user terminal, etc.). The positioning technology used in the present disclosure may include a global positioning system (GPS), a global navigation satellite system (GLONASS), a compass navigation system (COMPASS), a Galileo positioning system, a quasi-zenith satellite system (QZSS), a Beidou navigation satellite system, a wireless fidelity (WiFi) positioning technology, or the like, or any combination thereof. One or more of the above positioning technologies may be used interchangeably in the present disclosure. For example, the GPS-based method and the WiFi-based method may be used together as positioning technologies to locate the wireless device.

As used in the present disclosure, "speech information" may refer to a stream of audio data. The terms "speech information" and "speech data" may be used interchangeably. In some embodiments, the speech information may be acquired by a microphone of a user terminal (e.g., a cellphone, a built-in device of a vehicle). In some embodiments, the speech information may be converted to texts and displayed on a screen of the user terminal before being further processed by the user terminal (e.g., when a user is "typing" by voices). In some embodiments, the speech information may be converted to a voice command for controlling the user terminal to, e.g., play music, dial a number, or the like. In some embodiments, speech information may be converted to a service request (e.g., taxi services, navigation services, etc.) Operations related to the service request may be performed after the speech information is recognized. For example, a taxi service may be transmitted to a service provider (e.g., a driver) after the destination, the start location, and/or the start time are recognized.

An aspect of the present disclosure relates to systems and/or methods for speech recognition. For example, speech information may be obtained from a user terminal. The speech information may be processed to generate a plurality of candidate recognition results and corresponding preliminary scores. Each of the plurality of candidate recognition results may be further evaluated. For instance, one or more keywords may be extracted from each of the plurality of candidate recognition result. The one or more extracted keywords may be compared with a plurality of sample keywords to determine target sample keywords from the plurality of sample keywords. At least one parameter may be determined based on the one or more extracted keywords, including a search parameter associated with the matching degree between the extracted keyword(s) and the target sample keyword(s), a popularity parameter associated with the usage of the target sample keyword(s) by a plurality of users, a preference parameter associated with the usage of the target sample keyword by the user who provides the speech information, a distance parameter associated with a road distance from a start location to a destination determined based on the target sample keyword(s), or the like, or any combination thereof. An updating coefficient may be determined based on the at least one parameter and used to update the preliminary score corresponding to each of the plurality of candidate recognition results. A target recognition result may be selected from the plurality of candidate results based on the updated scores.

FIG. 1 is a schematic diagram of an exemplary speech recognition system according to some embodiments of the present disclosure. For example, the speech recognition system 100 may be a service platform for speech recognition services. The speech recognition system 100 may include a server 110, a network 120, a user terminal 130, and a storage (also referred to as a database) 140. The server 110 may include a processing engine 112.

The server 110 may be configured to process speech information. For example, the server 110 may obtain the speech information of a user from the user terminal 130 via the network 120. The server 110 may access databases in the storage 140 and recognize the speech information based on the databases in the storage 140. The recognition result of the speech information may be transmitted back to the user terminal 130 via the network 120. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the user terminal 130, and/or the storage 140 via the network 120. As another example, the server 110 may be directly connected to the user terminal 130, and/or the storage 140 to access information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process the speech information to perform one or more functions of the server 110 described in the present disclosure. In some embodiments, the processing engine 112 may obtain the speech information of a user from the user terminal 130 and recognize the speech information to generate a plurality of candidate recognition results and a plurality of preliminary scores. The processing engine 112 may further determine an updating coefficient for each of the candidate recognition results and update the preliminary scores based on the updating coefficients. For instance, the processing engine 112 may obtain target data from one or more databases stored in the storage 140 and determine the updating coefficient based on the target data.

The processing engine 112 may further determine a target recognition result from the candidate recognition results based on the updated scores. For a service request-related speech information, the processing engine 112 may generate a service request based on the target recognition result and perform operations related to the service request, such as generating a service request, searching for a service provider related to the service request, transmitting the service request to the service provider, etc. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the speech recognition system 100 (e.g., the server 110, the user terminal 130, and/or the storage 140) may transmit information and/or data to other component(s) in the speech recognition system 100 via the network 120. For example, the server 110 may obtain/acquire speech information from the user terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the speech recognition system 100 may be connected to the network 120 to exchange data and/or information.

The user terminal 130 may be associated with a user. In some embodiments, the user terminal 130 may acquire speech information from a user. The user terminal 130 may transmit the speech information to the server 110 (e.g., the processing engine 112). In some embodiments, the user terminal 130 may perform one or more functions of the processing engine 112 described earlier, such as the generation of the candidate recognition results, the determination of the target recognition result, or the like. In some embodiments, the user terminal 130 may perform operations related to the speech information, such as playing music, dial a number, determining a navigation route from a start location to a destination, generating a service request, etc. In some embodiments, the user terminal 130 may include a mobile device 130-1, a tablet computer 130-2, a laptop computer 130-3, a tabletop computer 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the user terminal 130 may be a wireless device with positioning technology for locating the position of the user and/or the user terminal 130.

The storage 140 may store data and/or instructions. In some embodiments, the storage 140 may store data obtained/acquired from the user terminal 130. In some embodiments, the storage 140 may store data and/or instructions that the server 110 may execute or use to perform exemplary methods described in the present disclosure. For example, the storage 140 may store a recognition model for recognizing the speech information. As another example, the storage 140 may store one or more databases, such as a sample keyword database (also referred to as a POI database when used in a transportation service), a popularity information database, a preference database, a travel means database, or the like, or a combination thereof. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 140 may be connected to the network 120 to communicate with one or more components in the speech recognition system 100 (e.g., the server 110, the user terminal 130, etc.). One or more components in the speech recognition system 100 may access the data or instructions stored in the storage 140 via the network 120. In some embodiments, the storage 140 may be directly connected to or communicate with one or more components in the speech recognition system 100 (e.g., the server 110, the user terminal 130, etc.). In some embodiments, the storage 140 may be part of the server 110.

In some embodiments, one or more components in the speech recognition system 100 (e.g., the server 110, the user terminal 130, etc.) may have a permission to access the storage 140. In some embodiments, one or more components in the speech recognition system 100 may read and/or modify information related to a user when one or more conditions are met. For example, the server 110 may obtain target data from the storage 140, including sample keywords, popularity information, preference information associated with the user of the user terminal 130, statistical data related to at least one travel means (also referred to as travel means information), or the like, or a combination thereof.

One of ordinary skill in the art would understand that when an element of the speech recognition system 100 performs, the element may perform through electrical signals and/or electromagnetic signals. For example, when a user terminal 130 processes a task, such as inputting speech data, identifying or selecting an object, the user terminal 130 may operate logic circuits in its processor to perform such task. When the user terminal 130 transmits out speech information to the server 110, a processor of the server 110 may generate electrical signals encoding the speech information. The processor of the server 110 may then transmit the electrical signals to an output port. If the user terminal 130 communicates with the server 110 via a wired network, the output port may be physically connected to a cable, which further transmit the electrical signal to an input port of the server 110. If the user terminal 130 communicates with the server 110 via a wireless network, the output port of the service requester terminal 130 may be one or more antennas, which convert the electrical signal to electromagnetic signal. Within an electronic device, such as the user terminal 130, and/or the server 110, when a processor thereof processes an instruction, transmits an instruction, and/or performs an operation, the instruction and/or operation may be conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
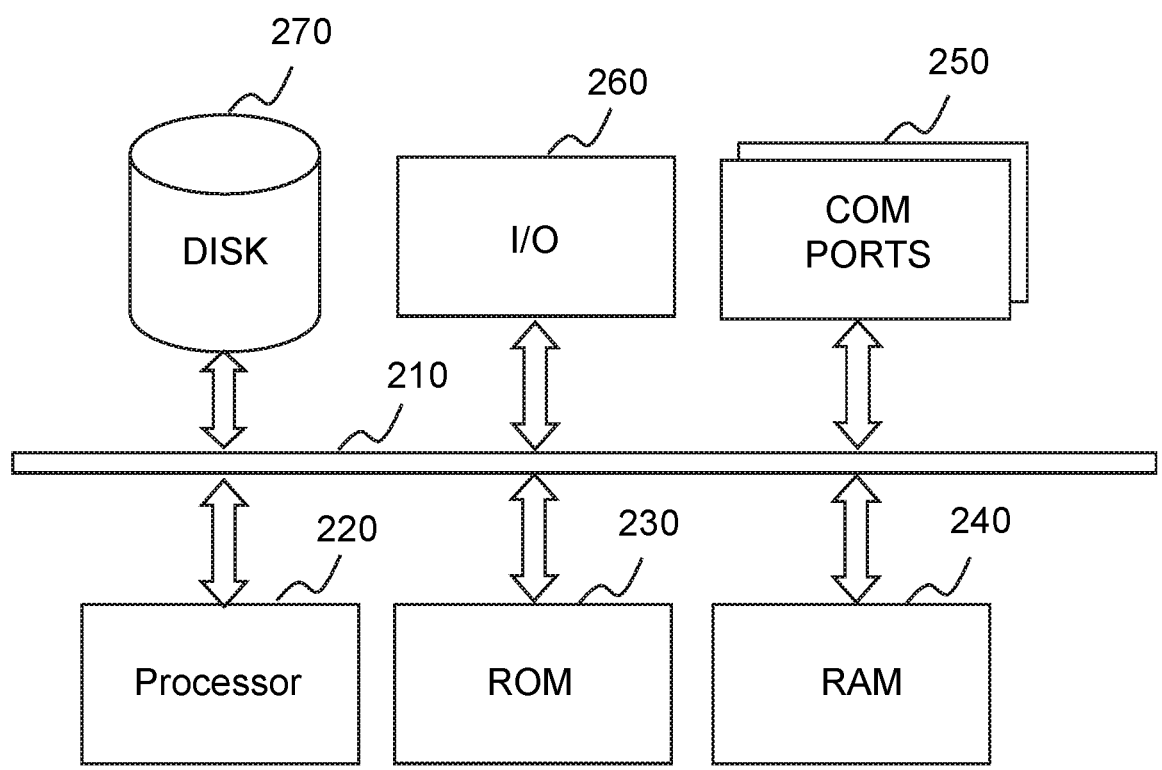
FIG. 2 is a schematic diagram illustrating exemplary hardware and/or software components of an exemplary computing device according to some embodiments of the present disclosure.

FIG. 2 is a schematic diagram illustrating exemplary hardware and/or software components of a computing device according to some embodiments of the present disclosure. In some embodiments, the server 110 and/or the user terminal 130 may be implemented on the computing device 200 shown in FIG. 2. For example, the processing engine 112 may be implemented on the computing device 200 and configured to perform functions of the processing engine 112 disclosed in this disclosure.

The computing device 200 may be used to implement any component of the speech recognition system 100 as described herein. For example, the processing engine 112 may be implemented on the computing device 200, via its hardware, software program, firmware, or a combination thereof. Although only one such computer is shown, for convenience, the computer functions relating to the speech recognition service as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may further include program storage and data storage of different forms including, for example, a disk 270, and a read-only memory (ROM) 230, or a random-access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B, or the first and second processors jointly execute steps A and B).

Figure 3:
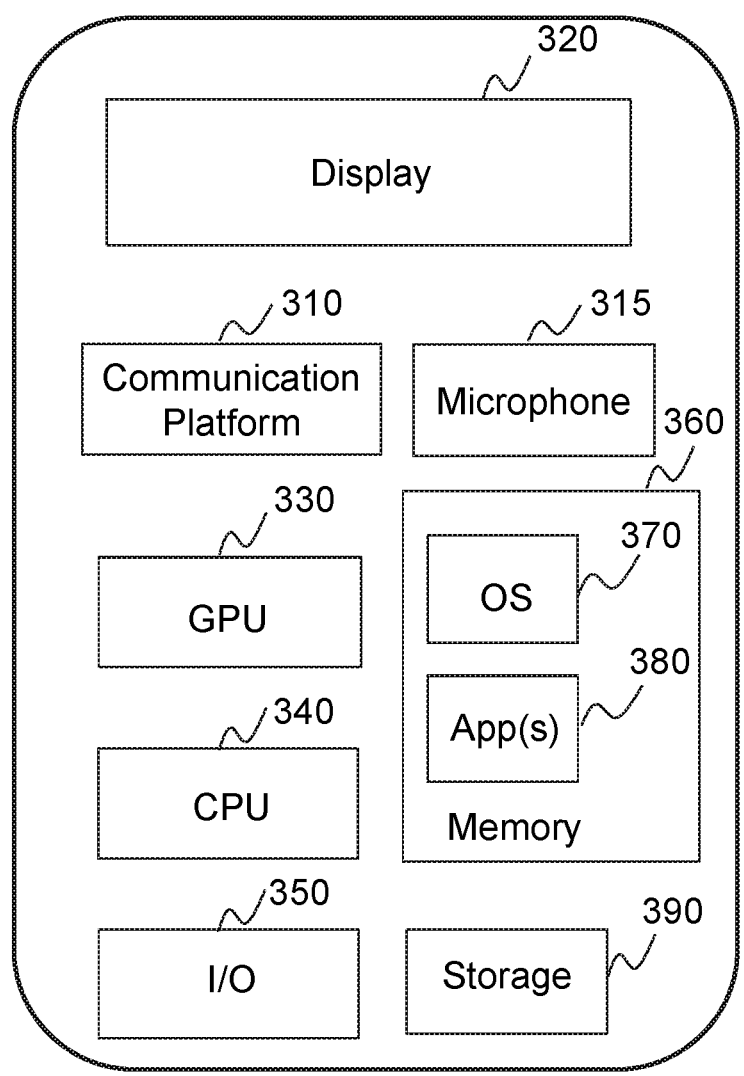
FIG. 3 is a schematic diagram illustrating an exemplary terminal device according to some embodiments of the present disclosure.

FIG. 3 is a schematic diagram illustrating exemplary hardware and/or software components of a terminal device according to some embodiments of the present disclosure. In some embodiments, the user terminal 130 may be implemented on the terminal device 300 shown in FIG. 3. The terminal device 300 may be a mobile device, such as a mobile phone of a passenger or a driver, a built-in device on a vehicle driven by the driver. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300.

In some embodiments, a mobile operating system 370 (e.g., iOS™, Android™, Windows Phone™, etc.) and one or more Apps (applications) 380 may be loaded into the memory 360 from the storage 390 in order to be executed by the CPU 340. In some embodiments, the terminal device 300 may include a microphone 315 or the like for acquiring speech information. The microphone 315 may continuously acquire speech information when the terminal device 300 is working or when a speech-related App 380 is running. For instance, the speech-related App 380 may include an online transportation service App (e.g., DiDi Taxi), an E-business App (e.g., Taobao, Ebay, Amazon), a voice control App (e.g., Siri™), etc. The microphone 315 may continuously acquire speech information when a user opens the speech-related App 380. In some embodiments, the terminal device 300 may include a recording button such that when a user presses and holds the recording button, the microphone 315 may start acquiring speech information. The microphone 315 may continuously acquire the speech information until the user releases the button or a preset time length of recording is reached. As another example, the speech-related App 380 may provide a recording icon on a graphic user interface (GUI) of the terminal device 300 via the display 320 such that when a user touches the recording icon, the microphone 315 start acquiring speech information. In some embodiments, the CPU 340 may obtain data from the storage 390 and recognize the speech information to determine a target recognition result based on the data obtained from the storage 390. Alternatively, or additionally, the terminal device 300 may transmit the speech information to the server 110 or the processing engine 112 to be recognized. In some embodiments, the target recognition result may be displayed on a GUI of the terminal device 300 via the display 320. In some embodiments, apart from the target recognition result, the candidate recognition results may also be displayed on the display 320 in a descending order of the updated scores. In some embodiments, the user may confirm and/or modify the target recognition result or a service request related to the target recognition result. User interactions may be achieved via the I/O 350 and provided to the server 110 and/or other components of the speech recognition system 100 via the network 120. The terminal device 300 may transmit/receive data related to the speech information via the communication platform 310. For example, the terminal device 300 may transmit the speech information to the server 110 via the communication platform 310.

Figure 4:
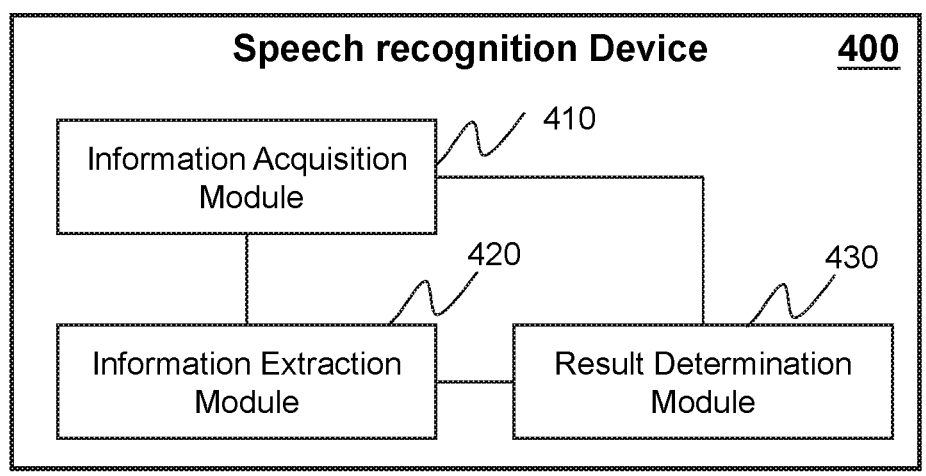
FIG. 4 is a block diagram illustrating an exemplary speech recognition device according to some embodiments of the present disclosure.

FIG. 4 is a block diagram illustrating an exemplary speech recognition device according to some embodiments of the present disclosure. The speech recognition device 400 may be in communication with a storage medium (e.g., the storage 140 of the speech recognition system 100, and/or the storage 390 of the terminal device 300), and may execute instructions stored in the storage medium. In some embodiments, the processing engine 400 may include an information acquisition module 410, an information extraction module 420, and a result determination module 430.

The information acquisition module 410 may be configured to acquire data/information related to speech recognition. For example, the information acquisition module 410 may obtain speech information from a user terminal (e.g., the user terminal 130 or a microphone thereof). The user terminal may acquire the speech information uttered by a current user of the user terminal. The information acquisition module 410 may further obtain information associated with the user terminal, such as the positioning information of the user terminal when the speech information is acquired by the user terminal, a user identification (e.g., a user account name) associated with the user, or the like, or a combination thereof. As another example, the information acquisition module 410 may obtain a plurality of candidate recognition results of the speech information and a plurality of preliminary scores.

The information extraction module 420 may be configured to extract one more keywords from each of the candidate recognition results. The information extraction module 420 may extract the one or more keywords based on a predetermined rule. For example, when the speech information is used for transportation services, the information extraction module 420 may extract the contents after a destination indicating word (also referred to as destination information) as a keyword of destination, and extract the contents after a start location indicating word (also referred to as start location information) as a keyword of start location.

The result determination module 430 may be configured to determine a target recognition result of the speech information. For instance, the result determination module 430 may modify the preliminary score corresponding to the each of the plurality of candidate recognition results based on the one or more extracted keywords, and determine, based on a result of the modification, a target recognition result of the speech information. In some embodiments, the result determination module 430 may include an updating coefficient determination sub-module and an information modification sub-module. The updating coefficient determination sub-module may be configured to determine an updating coefficient for the each of the plurality of candidate recognition results having the one or more extracted keywords based on a similarity (also referred to as "matching degree") between the one or more extracted keywords and a plurality of sample keywords in a predetermined sample database. For example, the updating coefficient determination sub-module may select one or more sample keywords from the plurality of sample keywords as target sample keywords (also referred to as "selected sample keywords), wherein the similarity between the one or more extracted keywords and the one or more target sample keywords is greater than a similarity threshold. The updating coefficient determination sub-module may be determined based on at least one parameter associated with the one or more target sample keywords, including a search parameter, a popularity parameter, a preference parameter, a distance parameter, or the like, or a combination thereof. In some embodiments, the updating coefficient determination sub-module may include a similarity determination unit, a search parameter determination unit, a preference parameter determination unit, a popularity parameter determination unit, and an updating coefficient determination unit. The similarity determination unit may be configured to determine a similarity between the one or more extracted keywords and the plurality of sample keywords. The search parameter determination unit may be configured to convert the similarity to a search parameter according to a third conversion relationship between similarities and search parameters. The preference parameter determination unit may be configured to determine a similarity between the one or more extracted keywords and a plurality of sample keywords, and converting the similarity to a preference parameter according to a fourth conversion relationship between similarities and preference parameters. The popularity parameter determination unit may be configured to determine a popularity parameter based on the similarity, the popularity information of the plurality of sample keywords, and a first conversion relationship between popularity information and popularity parameters. The updating coefficient determination unit may be configured to determine the updating coefficient of the each of the plurality of candidate recognition results having the one or more extracted keywords by, for example, adding the search parameter to, or multiplying the search parameter by, a higher value between the preference parameter and the popularity parameter. The information modification sub-module may be configured to update the preliminary score corresponding to the each of the plurality of candidate recognition results based on the updating coefficient to generate an updated score corresponding to the each of the plurality of candidate recognition results. For instance, the information modification sub-module may update the preliminary score by multiplying the updating coefficient by the preliminary score. In some embodiments, each of the updating coefficients corresponding to the candidate recognition results may be normalized, i.e., converted to a number between 0 and 1. The information modification sub-module may update the preliminary score by multiplying the normalized updating coefficient by the preliminary score.

In some embodiments, the speech recognition device 400 may further include a preliminary score determination module, an extraction module, a first parameter assignment module, a second parameter assignment module, a modification module, and an output module (not shown in the figure). Some or all of these modules may be integrated into the result determination module 430 as sub-modules.

The preliminary score determination module may be configured to receive and analyze speech information to generate a plurality of candidate recognition results of the speech information and a plurality of preliminary scores, wherein each of the plurality of preliminary scores corresponds to one of the plurality of candidate recognition results. For example, the preliminary score determination module may recognize the speech data based on a recognition model (e.g., the recognition model 500) to generate a plurality of candidate recognition results and corresponding preliminary scores.

The first parameter assignment module may be configured to search a database for one or more point of interests (POIs) that match with each of the at least one location, and determining a first parameter (e.g., the search parameter) of the each of the plurality of candidate recognition results based on a result of matching between the searched one or more POIs and the each of the at least one location. For instance, when a POI that matches with the at least one location is found in the database, the first parameter assignment module may determine the first parameter of the recognition result as 1; when no POI that matches with the at least one location is found in the database, the first parameter assignment module may determine a matching degree between each of the one or more POIs in the database and the at least one location. When the matching degree between the each of the one or more POIs and the at least one location is less than or equal to a first matching degree threshold, the first parameter assignment module may determine the first parameter of the recognition result as 0; and when the matching degree between the each of the one or more POIs and the at least one location is greater than the first matching degree threshold, the first parameter assignment module may determine the first parameter of the recognition result based on the matching degree, wherein the first parameter of the recognition result may be positively correlated (e.g., proportional) to the matching degree.

The second parameter assignment module may be configured to determine a location type of the each of the at least one location in the each of the plurality of candidate recognition results, and determining a second parameter (e.g., the distance parameter) of the each of the plurality of candidate recognition results based on the location type. In some embodiments, the second parameter assignment module may further include a start location determination sub-module, a destination determination sub-module, a distance determination sub-module, and a probability determination sub-module. The start location determination sub-module may be configured to determine a start location based on the at least one location. The destination determination sub-module may be configured to determine a destination based on the at least one location. The distance determination sub-module may be configured to determine distance information (e.g., a road distance from the start location to the destination) for the each of the plurality of candidate recognition results. The probability determination sub-module may be configured to determine a usage probability for each of the at least one travel means based on the number of travels corresponding to the each of the at least one travel means and a total number of travels in a statistical time period. The usage probability may be determined as or converted to the second parameter.

The modification module may be configured to determine an updated score corresponding to the each of the plurality of candidate recognition results based on the first parameter, the second parameter and the preliminary score.

The output module may be configured to determine a highest updated score among a plurality of updated scores corresponding to the plurality of candidate recognition results, and outputting a recognition result corresponding to the highest updated score.

In some embodiments, the speech recognition device 400 may further include a correlation module. The correlation module may be configured to correlate a description (e.g., a name or an address) relating to each POI with a location corresponding to the POI, and store the correlation into the database. For instance, the extracted keywords from the candidate recognition results may be a description relating to a POI used by the user, and may be the same as or different from the sample keywords. The correlation module may store the correlation of the description relating to each POI used by the user with a location corresponding to the POI to update the database.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. The modules, sub-modules or units described above may be connected to or communicate with each other via a wired connection or a wireless connection. In some embodiments, two or more of the modules/sub-modules/units may be combined into a single module/sub-module/unit, respectively, and any one of the modules/sub-modules/units may be divided into two or more modules/sub-modules/units, respectively.

Figure 5:
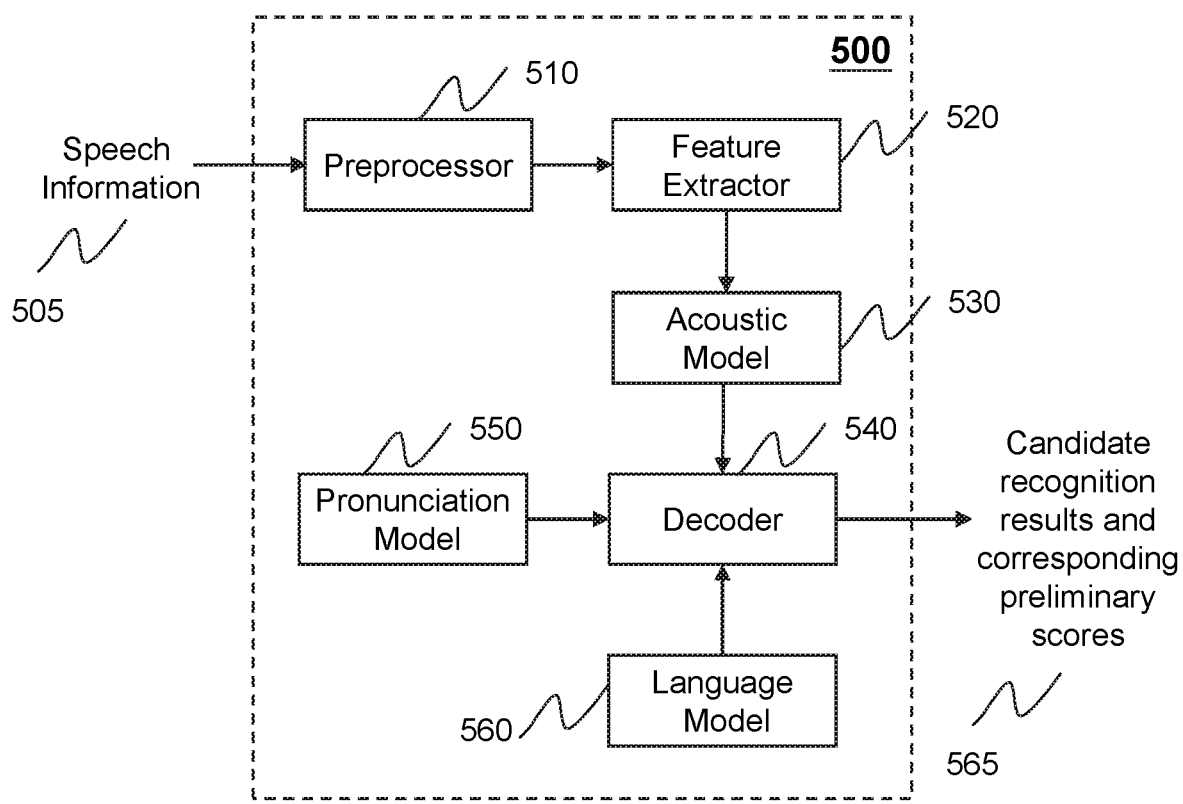
FIG. 5 is a schematic diagram illustrating an exemplary process for speech recognition according to some embodiments of the present disclosure.

FIG. 5 is a schematic diagram illustrating an exemplary process for speech recognition according to some embodiments of the present disclosure. In some embodiments, the speech information 505 may be input to a recognition model 500. The recognition model 500 may be implemented by or included in the user terminal 130 and/or the processing engine 112. The recognition model 500 may generate a plurality of candidate recognition results and corresponding preliminary scores 565 as an output based on the input of the speech information. Each of the preliminary score may correspond to one of the candidate recognition results. In some embodiments, the candidate recognition results may be text information associated with words, phrases, sentences, or letters.

In some embodiments, the recognition model 500 may be stored in a storage (e.g., the storage 140 of the speech recognition system 100, or the storage 390 of the terminal device 300). As shown in FIG. 5, the recognition model 500 may include a preprocessor 510, a feature extractor 520, an acoustic model 530, a decoder 540, a pronunciation model 550, and a language model 560.

The preprocessor 510 may preprocess the speech information 505. For example, the speech information 505 to be recognized may be preprocessed to be divided into a plurality of audio frames by the preprocessor 510. In some embodiments, the preprocessing of the speech information 505 may further include a noise filtering, an enhancement, a channel equalization, a domain conversion (e.g., a time-frequency domain conversion via Fourier Transform (FT), a frequency-time domain conversion via Inverse Fourier Transform (IFT), or the like, or any combination thereof.

The feature extractor 520 may extract appropriate acoustic feature information from the converted audio frames in the frequency domain.

The acoustic model 530 may determine the pronunciation data corresponding to the audio signals based on the acoustic feature information. For example, the acoustic model 530 may be trained according to a plurality of sample pronunciations and corresponding sample acoustic feature information from a pronunciation database (e.g., a pronunciation data stored in the storage 140). The acoustic model 530 may use the acoustic feature information as an input for mapping the acoustic feature information to pronunciations corresponding to the audio frames. The acoustic model 530 may determine a first probability of mapping the audio frames to each pronunciation. In some embodiments, the pronunciation model 550 may determine a plurality of words or characters corresponding to the pronunciations and second probabilities related to the words or characters. In some embodiments, the language model 560 may include correlations between different language units (e.g., words, characters, or phrases) and possibilities corresponding to the correlations. The language model 560 may estimate the third probabilities of various texts constructed based on the language units.

The decoder 540 may build a recognition network based on the acoustic model 530, the language model 560 and the pronunciation model 550. Each path in the recognition network (similar to a branch node in neural network) may correspond to a text and/or a text related pronunciation. Then the decoder 540 may determine a preliminary score for each path of the recognition network based on the pronunciations outputted by the acoustic model, thereby obtaining preliminary recognition results and corresponding preliminary scores.

In some embodiments, the processing engine 112 or the terminal device 300 may determine a plurality of candidate recognition results and corresponding preliminary scores 565 based on the preliminary recognition results and corresponding preliminary scores. For instance, the processing engine 112 or the user terminal 130 may select a plurality of preliminary recognition results having relatively high preliminary scores from all of the preliminary recognition results as the candidate recognition results. Merely by way of example, the preliminary recognition results having preliminary scores higher than a predetermined score threshold may be determined as the candidate recognition results. As another example, the preliminary recognition results corresponding to the top N scores may be determined as the candidate recognition results, N may be a natural number greater than 1, such as 5, 10, 20, etc. In some embodiments, all of the preliminary recognition results may be determined as the candidate recognition results.

In some embodiments, a target recognition result corresponding to the speech information may be determined from the candidate recognition results. For example, the processing engine 112 or the user terminal 130 may determine a candidate recognition result corresponding to the highest preliminary score as the target recognition result. As another example, the processing engine 112 or the user terminal 130 may further update the preliminary scores corresponding to the candidate recognition results based on updating coefficients to generate updated scores, and determine the target recognition result based on the updated scores. Detailed descriptions regarding the determination of the target recognition result based on the candidate recognition results may be found elsewhere in the present disclosure, for example, in FIG. 6 and the descriptions thereof.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the preprocessor 510 and/or the feature extractor 520 may be omitted in the recognition model 500. As another example, the recognition model 500 may be located outside the speech recognition system 100. More particularly, the speech information may be recognized by a recognition model 500 outside the speech recognition system 100 to generate the candidate recognition results and the corresponding preliminary scores, and the speech recognition system 100 (e.g., the server 110, the processing engine 112, the user terminal 130) may obtain and process the candidate recognition results and the corresponding preliminary scores directly.

Figure 6:
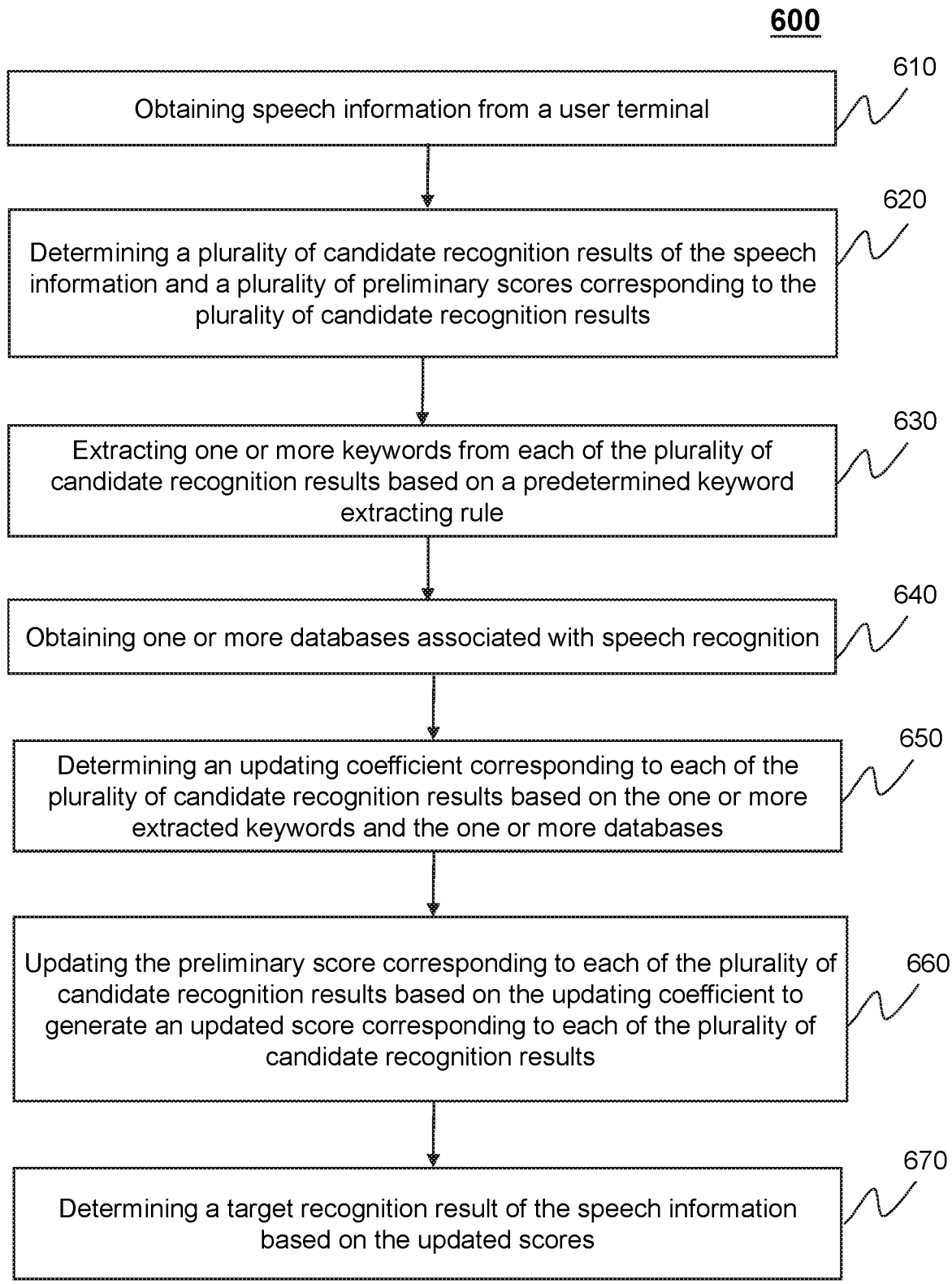
FIG. 6 is a flowchart of an exemplary process for determining a target recognition result of the speech information according to some embodiments of the present disclosure.

FIG. 6 is a flowchart of an exemplary process for determining a target recognition result of the speech information according to some embodiments of the present disclosure. The process 600 may be executed by the speech recognition system 100. For example, the process 600 may be implemented as a set of instructions (e.g., an application) stored in a storage (e.g., the storage 140 of the speech recognition system 100 in FIG. 1, the storage 390 of the terminal device 300 in FIG. 3). The modules of the speech recognition device 400 in FIG. 4 may execute the set of instructions, and when executing the instructions, the modules may be configured to perform the process 600. In some embodiments, at least a part of the speech recognition device 400 may be implemented on the processing engine 112 and/or the terminal device 300. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the speech recognition device 400 (e.g., the information acquisition module 410) may obtain speech information from a user terminal (e.g., the user terminal 130 or a microphone thereof, the terminal device 300 or a microphone thereof). The user terminal may acquire the speech information uttered by a user of the user terminal. In some embodiments, the speech recognition device 400 may further obtain information associated with the user terminal, such as the positioning information of the user terminal when the speech information is acquired by the user terminal, a user identification (e.g., a user account name) associated with the user, or the like, or a combination thereof.

In 620, the speech recognition device 400 (e.g., the result determination module) may determine a plurality of candidate recognition results of the speech information and a plurality of preliminary scores corresponding to the plurality of candidate recognition results. In some embodiments, the speech information may be recognized by a recognition model (e.g., the recognition model 500) to generate the plurality of candidate recognition results based on a speech recognition method. The speech recognition method may include but is not limited to a feature parameter matching algorithm, a hidden Markov model (HMM) algorithm, an artificial neural network (ANN) algorithm, etc.

In some embodiments, the determination of the candidate recognition results and the corresponding preliminary scores may be performed by the processing engine 112 and/or the user terminal 130. The candidate recognition results and the corresponding scores thereof may be determined in pairs, such as (candidate recognition result 1, preliminary score 1), (candidate recognition result 2, preliminary score 2), etc.

The preliminary score may be any numerals such as 10, 30, 500, etc. or fall in the range of 0-1, such as 0.3, 0.5, 0.8, etc.

In 630, the speech recognition device 400 (e.g., the information extraction module 420) may extract one or more keywords from each of the plurality of candidate recognition results based on a predetermined keyword extracting rule.

When the speech recognition device 400 is used in a car-hailing service or a navigation service, the one or more extracted keywords may include a point of interest (POI), a street name, etc. When the speech recognition device 400 is used in an E-business service, the one or more extracted keywords may include a merchant name, a goods name, a price. The one or more keywords may be extracted from a software or an App installed in the speech recognition device 400 that the speech information is inputted. For example, if the speech information is input to a car hailing service App or a navigation service App, keywords like a POI, a street name, or the like, may be extracted. If the speech information is input to an E-business App, keywords like a merchant name, a goods name, a price may be extracted.

In some embodiments, a candidate recognition result may be in a text form, and the term "candidate recognition result" and the term "recognition text" may be used interchangeably. In some embodiments, a candidate recognition results may be a sentence including a subject, a predicate, an object, an adverbial, etc. Sometimes, the subject and the adverbial may be omitted. For instance, the candidate recognition result may be: "I am going to Digital Valley", "go to Digital Valley", or "I want to go to Digital Valley from Xizhimen at 3 pm this afternoon", etc.

The predetermined keyword extracting rule may be a predetermined rule for extracting the keywords from the candidate recognition results. Multiple extracting rules may exist, and following exemplary description is associated with an extracting rule based on a structural template. In some embodiments, the structural template may be determined based on historical candidate recognition results or manually set by a user. In some embodiments, contents in the candidate recognition results that match with the structural template may be determined as the keywords.

Taking a transportation scenario as an example, the structural template related to a destination may be {a destination indication word (also referred to as destination information)+a POI (or a location)}. The destination indicating word may include texts such as "I am going to", "the destination is", "go to", etc. The contents after the destination indicating word may be extracted as a keyword of destination. As another example, the structural template related to a start location may be {a start location indication word (also referred to as start location information+a POI (or a location)}. The start location indicating word may include texts such as "I am in", "I am at", "from", etc. The contents after the start location indicating word may be extracted as a keyword of start location. When the speech information is used for transportation services, such extracted keywords may also be referred to as "suspected POIs". The destination indicating word and the start location indicating word may also be referred to as the location type indicating words. Merely by way of example, for the candidate recognition result "I want to go to Digital Valley from Xizhimen", since the start location indicating word "from" is present immediately before "Xizhimen", "Xizhimen" may be extracted as a suspected POI of the start location. Similarly, since the destination indicating word "to" is present before "Digital Valley", "Digital Valley" may be extracted as a suspected POI of the destination.

In some embodiments, if no keywords meeting the predetermined type are extracted from a candidate recognition result, the preliminary score of the candidate recognition result may be reduced, or the candidate recognition result may be deleted. In some embodiments, if no keywords meeting the predetermined type are extracted from all of the candidate recognition results, a prompt message may be transmitted to the user terminal 130 to notify the user that the provided speech information may not be recognized or have insufficient information to, for example, generate a service request or voice command. The prompt message may also include a suggestion and/or instruction for the user to provide the speech information again. For example, the prompt message may be "Sorry, I did not recognize it. Please say it again."

In 640, the speech recognition device 400 (e.g., the information acquisition module 410) may obtain one or more databases associated with speech recognition. The one or more databases associated with speech recognition may be stored in a storage medium (e.g., the storage 140 of the speech recognition system 100 in FIG. 1, the storage 390 of the terminal device 300 in FIG. 3). In some embodiments, the one or more databases associated with speech recognition may include a sample keywords database, a popularity database, a preference database, a travel means database, or the like, or any combination thereof. The sample keywords database may include a plurality of sample keywords used in different scenarios, such as POIs, street names, merchant names, goods names, food names, common voice commands, App names, etc. The popularity database may include the popularity information (e.g., a popularity degree) corresponding to each of the plurality of sample keywords being used among a plurality of users. For instance, the popularity degree may include the number of usage (e.g., a total number of usages or a frequency of usage) and/or the probability of using each of the plurality of sample keywords as input of the application related to the speech information to be recognized. In some embodiments, each of the plurality of sample keywords may correspond to a plurality of popularity degrees with respect to a plurality of periodical statistical time periods and/or a plurality of geographical regions. The periodical statistical time period may include one week, one month, or one season (spring, summer, autumn and winter). The periodical statistical time period may also include peak hours such as a time period on the way to work and a time period on the way home after work (e.g., 8:00 am-9:30 am, 5:00 pm-6:30 pm), and non-peak hours. The periodic statistical time period may also include a weekday, a weekend, a holiday, etc. The geographical regions may include a block, a street, a city, a town, a county, a province, a country, a continent, etc.

The preference database may include preference information (e.g., a preference degree) corresponding to each of the plurality of sample keywords being used by the user of the terminal device. The user of the terminal device may be identified by the user identification obtained from the terminal device 130 in 610. For example, the preference degree may include historical information associated with the user, such as whether the user has used the sample keyword before, the number of usage and/or the probability of using the sample keyword by the user in the past, etc. In some embodiments, each of the plurality of sample keywords may correspond to a plurality of preference degrees with respect to a plurality of periodical statistical time periods and/or a plurality of geographical regions. In some embodiments, the preference information may be included in the popularity information in the popularity database. For example, the popularity database may be searched to generate the preference information of a user regarding a sample keyword.

The travel means database may include travel means information related to various distance information. The travel means information may include the number of usage or the probability of using each of a plurality of travel means corresponding to various distance information (e.g., different road distances). For instance, the travel means may include walking, riding a bicycle, driving, taking a taxi, taking a bus, taking a train, taking an airplane, etc. Merely by way of example, the travel means database may include probability distribution data related to different distance information corresponding to each of the plurality of travel means. In some embodiments, the probability distribution data may be depicted as a plurality of probability curves corresponding to the plurality of travel means. Each probability curve may demonstrate a probability trend of using different travel means with respect to different road distances. For instance, in a probability curve corresponding to taking a taxi, the probability may be relatively low when the road distance is less than 1 Km, and gradually increased to a relatively high value when the road distance increases from 1 Km to 20 Km. When the road distance increases from 20 Km to 200 Km, the probability may be dramatically decreased.

In some embodiments, the one or more databases may be integrated into one database. For instance, the preference database may be integrated into the popularity database. As another example, the popularity information database and the preference information database may be integrated into the sample database.

In 650, the speech recognition device 400 (e.g., the result determination module 430) may determine an updating coefficient corresponding to each of the plurality of candidate recognition results based on the one or more extracted keywords and the one or more database associated speech recognition. The updating coefficient may be determined based on at least one parameter determined based on the one or more extracted keywords and the historical data. The at least one parameter may include, a search parameter, a popularity parameter, a preference parameter, a distance parameter, or the like, or a combination thereof.

In some embodiments, the speech recognition device 400 may determine a matching degree (also referred to as a "similarity") between the extracted keyword and each of the plurality of sample keywords, and determining one or more target sample keywords from the plurality of sample keywords. The matching degree between the each of the one or more target sample keywords and the extracted keyword may be higher than a first matching degree threshold. The speech recognition device 400 may determine the at least one parameter based on the one or more target sample keywords. For instance, the search parameter may be determined based on the matching degree between the one or more target sample keywords and the one or more extracted keywords. The popularity parameter may be determined based on the popularity information associated with the one or more target sample keywords. The preference parameter may be determined based on the preference information associated with the one or more target sample keywords. The distance parameter may be determined based on the travel means information associated with the one or more target sample keywords. In some embodiments, the term "search parameter" may also be referred to as the first parameter, and the term "distance parameter" may also be referred to as the second parameter. Details regarding the determination of the at least one parameter may be found elsewhere in the present disclosure, for example, in FIG. 7 and the description thereof.

In some embodiments, the speech recognition device 400 may determine the updating coefficient based on an average or a weighted average, a sum or a weighted sum, a product, or a combination thereof, of the at least one parameter. Other methods of determining the updating coefficient based on the at least one parameter may also be implemented, and these methods are also within the protection scope of the present disclosure. Merely by way of example, the speech recognition device 400 may determine a higher value between the popularity parameter and the preference parameter, and determine the updating coefficient by adding the higher value to the search parameter. As another example, the speech recognition device 400 may determine the updating coefficient by multiplying the search parameter by the distance parameter. In some embodiments, each of the updating coefficients corresponding to the candidate recognition results may be normalized, i.e., converted to a number between 0 and 1. The normalization of the each of the updating coefficients may include dividing the each of the updating coefficients by the highest updating coefficient among the updating coefficients. For example, three updating coefficients 20, 40, 50 may be normalized to 0.4 (20/50), 0.8 (40/50) and 1.0 (50/50), respectively.

In 660, the speech recognition device 400 (e.g., the result determination module 430) may update the preliminary score corresponding to each of the plurality of candidate recognition results based on the updating coefficient to generate an updated score corresponding to each of the plurality of candidate recognition results. For instance, the speech recognition device 400 may update the preliminary score by multiplying the updating coefficient by the preliminary score. The updated score of the candidate recognition result may be expressed as y{x, v(k), w [dist (a, b), D]}, where x may be the preliminary score, v may be a function for determining the search parameter, k may denote the matching degree of a target sample keyword or an average matching degree of multiple target sample keywords, a may denote the start location, b may denote the destination, dist may denote a function for determining the road distance between two locations, D may denote the probability distribution data related to different road distances, w may be a function for determining the distance parameter, and y may be a function for determining the updated score based on the search parameter and the distance parameter. In some embodiments, the speech recognition device 400 may update the preliminary score directly using the at least one parameter. For instance, the preliminary score corresponding to each candidate recognition result may be updated using the search parameter to generate an updated preliminary score. The updated preliminary score may be further updated using the distance parameter to generate the updated score. Other methods of updating the preliminary score may also be used, and these methods are also within the protection scope of the present disclosure.

In 670, the speech recognition device 400 (e.g., the result determination module 430) may determine a target recognition result of the speech information based on the updated scores. In some embodiments, the speech recognition device 400 may rank the candidate recognition results in a descending order of the corresponding updated scores. For example, the candidate recognition result corresponding to the highest score may be determined as the target recognition result. The target recognition result may be transmitted to the user terminal and/or to the processing engine 112. In some embodiments, information related to the target recognition result may also be transmitted to the user terminal and/or the processing engine 112. For instance, the information related to the target recognition result may include the target sample keywords. The target sample keywords may be used for a subsequent operation, such as generating a service request. For example, target sample keywords such as a start location and a destination may be transmitted to the processing engine 112 to generate a transportation service request.

In some embodiments, a candidate recognition result may correspond to a plurality of distance parameters corresponding to a plurality of travel means. Thus, the candidate recognition result may include a plurality of updated scores corresponding to the plurality of travel means. The speech recognition device 400 may compare all of the updated scores corresponding to the plurality of candidate recognition results, and determine a candidate recognition result corresponding to the highest updated score as the target recognition result. In some embodiments, the travel means corresponding to the target recognition result may be transmitted to the user terminal as a recommended travel means. For example, the speech recognition device 400 may generate a highest updated score of 0.5 for a speech information associated with a transportation service when the travel means is a bike, and a highest updated score of 0.8 for the same speech information associated with a transportation service when the travel means is a car. The speech recognition device 400 may determine the candidate recognition result with the updated score of 0.8 as target recognition result and recommend the car as a travel means for the user. If the user selects the bike as a travel means, the candidate recognition result with the updated score of 0.5 may be determined as the target recognition result.

In some embodiments, the target recognition result and a number of candidate recognition results having relatively high updated scores may be transmitted to the user terminal. For example, the relatively high updated scores may refer to scores higher than a score threshold, or the top three/five/ten scores, or the like. The user may confirm and/or modify the target recognition result via the user terminal 130. In some embodiments, the service request generated based on the target recognition result (e.g., by the server 110 or processing engine 112) may also be transmitted to the user terminal 130. The user may confirm and/or modify the service request via the user terminal. In some embodiments, the confirmed service request may be transmitted to a service provider, such as a driver.

Figure 7:
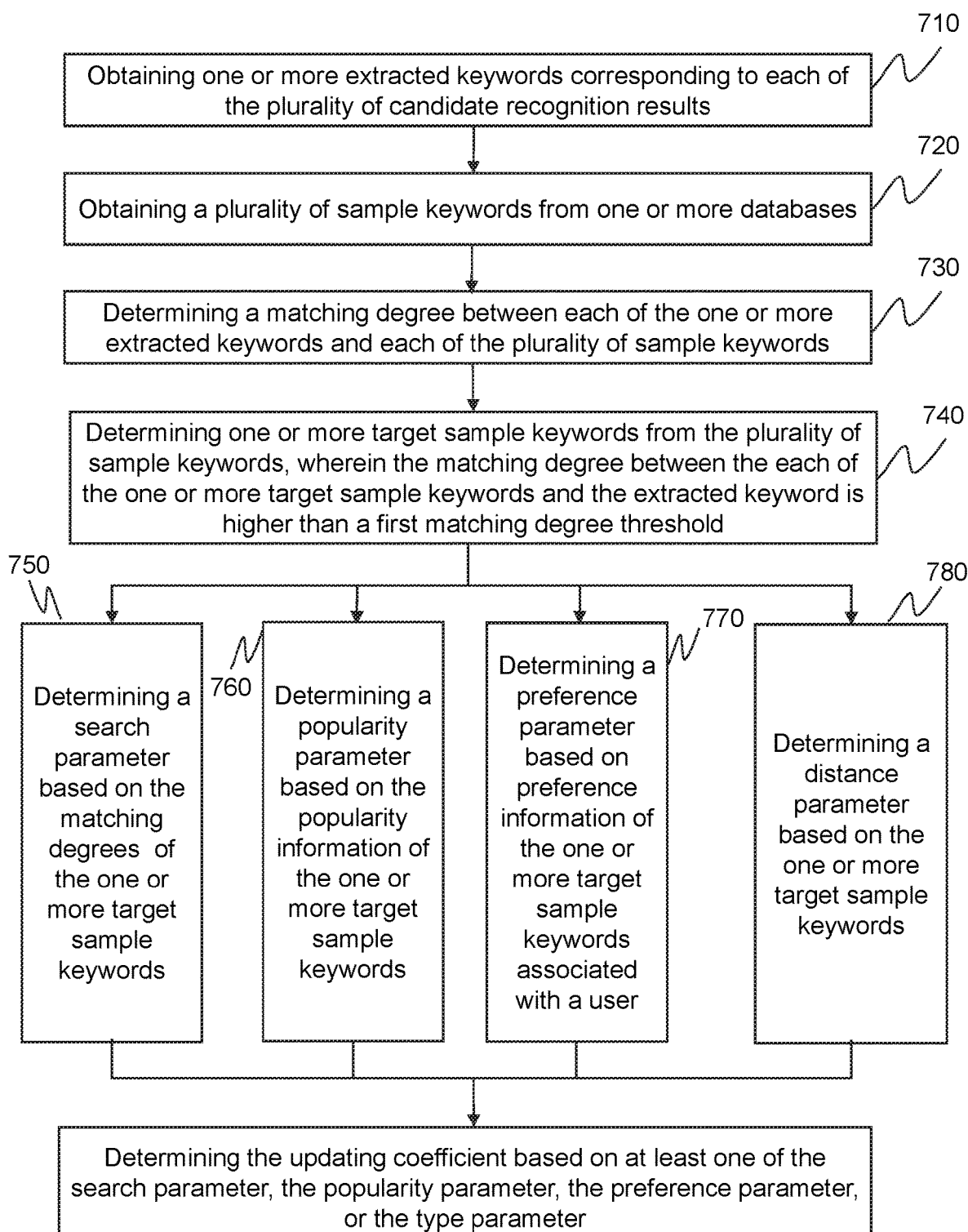
FIG. 7 is a flowchart of an exemplary process for determining an updating coefficient according to some embodiments of the present disclosure.

FIG. 7 is a flowchart of an exemplary process for determining an updating coefficient according to some embodiments of the present disclosure. The process 700 may be executed by the speech recognition system 100. For example, the process 700 may be implemented as a set of instructions (e.g., an application) stored in a storage (e.g., the storage 140 of the speech recognition system 100 in FIG. 1, the storage 390 of the terminal device 300 in FIG. 3). The processing engine 112, the terminal device 300 and/or modules in FIG. 4 may execute the set of instructions, and when executing the instructions, the processing engine 112, the terminal device 300 and/or the modules may be configured to perform the process 700. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the speech recognition device 400 (e.g., the information acquisition module 410) may obtain one or more extracted keywords corresponding to each of the plurality of candidate recognition results. In some embodiments, the one or more extracted keywords may be extracted based on the predetermined keyword extracting rule. For instance, keywords located immediately after a structure template may be extracted. Details regarding the extraction of the keywords may be found elsewhere in the present disclosure, for example, in the descriptions of operation 630 in FIG. 6. In some embodiments, the extracted keywords may include a character, a word, a phrase, a sentence, or the like.

In 720, the speech recognition device 400 (e.g., the information acquisition module 410) may obtain a plurality of sample keywords from one or more databases. In some embodiments, the one or more databases may include a sample keyword database (also referred to as a POI database when used in a transportation service), a popularity database, a preference database, a travel means database, or the like, or any combination thereof. Details regarding the one or more databases may be found, for example, in the description of operation 640.

In 730, the speech recognition device 400 (e.g., the result determination module 430) may determine a matching degree between each of the one or more extracted keywords and each of the plurality of sample keywords. In some embodiments, the matching degree may be determined based on an edit distance algorithm. As used herein, the term "edit distance" between a first text and a second text may refer to a minimum number of editing operations required to transform a first text to a second text. One applicable editing operation may include replacing one character with another character, inserting one character, or deleting one character, or the like. The edit distance may be inversely proportional to the similarity between the first text and the second text. This is, the smaller the edit distance is, the greater the similarity of the first text and the second is. The matching degree may be determined based on the edit distance between each of the one or more extracted keywords and each of the plurality of sample keywords.

In some embodiments, the matching degree may be determined according to a matching length. For instance, the matching degree may equal to a ratio of the matching length to the total length of the sample keyword. As used herein, the term "matching length" refers to the number of words or characters in a sample keyword that also exist in an extracted keyword. The term "total length of the keyword" refers to a total number of words or characters in the sample keyword. Merely by way of example, the extracted keywords from the candidate recognition results may relate to locations and may be referred to as suspected POIs. For a suspected POI "Digital Valley" (e.g., the extracted keyword), if a sample POI "Digital Valley" (e.g., the sample keyword) is found in the sample keyword database (also referred to as a "POI database"), the speech recognition device 400 may determine that the suspected POI "Digital Valley" and the sample POI "Digital Valley" are fully matched, and the matching degree between the extracted keyword and the sample keyword may be 1. For a suspected POI "Zhongguancun Street", if a sample POI "Zhongguancun Street" is not found in the POI database, but a sample POI "No. 1, Zhongguancun Street" and some other similar sample POIs are present in the POI database, then the matching degree between the suspected POI "Zhongguancun Street" and the sample POI "No. 1, Zhongguancun Street" may be determined according to a ratio of the matching length to the total length of the sample POI as 2/4=0.5, where 2 is the number of fully matched words between the suspected POI "Zhongguancun Street" and the sample POI "No. 1, Zhongguancun Street", and 4 is the total number of words for the sample POI "No. 1, Zhongguancun Street". It should be noted that other methods for determining the matching degree between each of the one or more extracted keywords and each of the plurality of sample keywords may also be used, which are within the protection scope of the present disclosure.

In 740, the speech recognition device 400 (e.g., the result determination module 430) may determine one or more target sample keywords from the plurality of sample keywords, wherein the matching degree between the each of the one or more target sample keywords and the each of the one or more extracted keywords is higher than a first matching degree threshold. The first matching degree threshold may be a predetermined value. For example, when the matching degree is determined based on the matching length, the first matching degree threshold may be a predetermined value between 0-1, such as 0.4, 0.5, etc.

In 750, the speech recognition device 400 (e.g., the result determination module 430) may determine a search parameter based on the one or more matching degrees of the one or more target sample keywords. The matching degree may be converted to the search parameter based on the third conversion relationship between matching degrees and the search parameter. For example, the search parameter may be positively related or proportional to the matching degree. In some embodiments, the matching degree may be multiplied by an adjusting ratio to generate the search parameter. The adjusting ratio may be less than or greater than 1. As another example, the search parameter may be the same as the matching degree. In some embodiments, for matching degrees less than the first matching degree threshold, the corresponding search parameters may be 0. Alternatively, or additionally, the candidate recognition results may be deleted.

In some embodiments, a plurality of matching degrees corresponding to a plurality of target sample keywords may be determined for each candidate recognition result. For example, the search parameter corresponding to each candidate recognition result may be determined based on the highest matching degree from the plurality of matching degrees. Alternatively, or additionally, the search parameter may be determined based on an average of the matching degrees greater than the first matching degree threshold.

In 760, the speech recognition device 400 (e.g., the result determination module 430) may determine a popularity parameter based on the popularity information of the one or more target sample keywords. For example, the popularity parameter may be determined as $h(q)=q^*$, where h may denote a function for converting the popularity information or popularity value to a popularity parameter. q may denote the popularity information or popularity value of the one or more target sample keywords, and $q^*$ may denote the popularity parameter. More particularly, the popularity information of the one or more target sample keywords may be converted to a popularity parameter based on a first conversion relationship between popularity information and popularity parameters. Alternatively, a popularity value (also referred to as "popularity degree") may be determined based on the popularity information. The popularity value may be converted to a popularity parameter based on a second conversion relationship between popularity degrees and popularity parameters.

In some embodiments, each target sample keyword may correspond to popularity information of a plurality of periodic statistical time periods and/or a plurality of geographical regions. The speech recognition device 400 may determine a statistical time period for a current time point and/or a current geographical region, and determine the popularity parameter based on the popularity value corresponding to the statistical time period and/or the current geographical region. The popularity value may be determined based on the number of usage (e.g., a total number of usages or a frequency of usage) and/or the probability of using each of the plurality of sample keywords.

In some embodiments, a plurality of popularity degrees corresponding to a plurality of target sample keywords may be determined for each candidate recognition results. The popularity parameter corresponding to each candidate recognition result may be determined based on the highest popularity value from the plurality of popularity degrees. Alternatively, or additionally, the popularity parameter may be determined based on an average of the plurality of popularity degrees.

In 770, the speech recognition device 400 (e.g., the result determination module 430) may determine a preference parameter based on preference information of the one or more target sample keywords associated with a user. The preference information may be converted to the preference parameter based on a third conversion relationship between preference information and preference parameters.

In some embodiments, each target sample keyword may correspond to preference information of a plurality of periodic statistical time periods and/or a plurality of geographical regions. The speech recognition device 400 may determine a statistical time period for a current time point and/or a current geographical region, and determine the preference parameter based on the preference information corresponding to the statistical time period and/or the current geographical region. If the preference information includes whether the user who provided the speech information has used a sample keyword, the preference parameter may be determined based on the matching degree corresponding to the target sample keyword. If the preference information includes a preference value associated with a number of usage (e.g., a total number of usages or a frequency of usage) and/or the probability of using each of the plurality of sample keywords by the user, the preference parameter may be determined based on the preference value corresponding to the target sample keyword. In some embodiments, for the same matching degree, the preference parameter converted according to the fourth conversion relationship between matching degrees and preference parameters is greater than the popularity parameter determined based on the first conversion relationship between popularity information and popularity parameters.

In some embodiments, a plurality of preference degrees corresponding to a plurality of target sample keywords may be determined for each candidate recognition results. For example, the preference parameter may be determined based on the highest matching degree from a plurality of matching degrees or an average matching degree based on the plurality of matching degrees. As another example, the preference parameter may be determined based on the highest preference value from a plurality of preference parameters or an average preference value based on the plurality of preference parameters.

In 780, the speech recognition device 400 (e.g., the result determination module 430) may determine a distance parameter based on the one or more target sample keywords. Merely by way of example, a user may input the speech information in the speech recognition device 400 to request for a transportation service. The one or more extracted keywords may include at least one location, such as a name of a street, a name of a store, an address, a POI, etc. The distance parameter may be determined based on distance information between a start location and a destination. For instance, the distance information may be a road distance between the start location and the destination.

The speech recognition device 400 may determine the location type of the one or more extracted keywords. The location type may include a start location type and a destination type. For example, if the candidate recognition result includes a location type indicating word associated with a start location (i.e., a start location indicating word or start location information) before an extracted keyword, the speech recognition device 400 may determine the location type of the extracted keyword as the start location type. Similarly, if the candidate recognition result includes a location type indicating word associated with a destination (i.e., a destination indicating word or destination information) before an extracted keyword, the speech recognition device 400 may determine the location type of the extracted keyword as the destination type.

Merely by way of example, if an extracted keyword of a start location type and a first POI from the one or more target sample POIs is fully matched, a first location corresponding to the first POI may be determined as the start location. If no target sample POI is fully matched with the extracted keyword of the start location type, a plurality of target sample POIs corresponding to a matching degree higher than a second matching degree threshold may be selected from the one or more target sample POIs and determined as second POIs. The second matching degree may be higher than or equal to the first matching degree. The speech recognition device 400 may determine second locations corresponding to the second POIs. The speech recognition device 400 may further determine an average location based on the second locations as the start location. Similarly, if an extracted keyword of a destination type and a third POI from the one or more target sample POIs is fully matched, a third location corresponding to the third POI may be determined as the destination. If no target sample POI is fully matched with the extracted keyword of the destination type, a plurality of target sample POIs corresponding to a matching degree higher than a third matching degree threshold may be selected from the one or more target sample POIs and determined as third POIs. The third matching degree may be higher than or equal to the first matching degree. The third matching degree may be the same as or different from the second matching degree. The speech recognition device 400 may determine fourth locations corresponding to the fourth POIs. The speech recognition device 400 may further determine a second average location based on the fourth locations as the destination.

In some embodiments, when no keyword of the start location type is extracted, the speech recognition device 400 may obtain positioning information of the user terminal that acquires the speech information and determine the positioning information of the user terminal as the start location. When no keyword of the destination type is extracted, the speech recognition device 400 may send a prompt message to the user terminal to notify the user that the speech information may not be recognized or have insufficient information to, for example, generate a service request or voice command, and the user may need to provide the speech information again. The speech recognition device 400 may obtain the re-provided speech information and determine the start location and the destination based on the re-provided speech information.

In some embodiments, the speech recognition device 400 may determine at least one travel means that the user may possibly use based on information received from the user terminal. For example, if the speech recognition device 400 determines that the speech information may be used associated with an online car-hailing service, the at least one travel means may be taking a taxi. As another example, if the speech recognition device 400 determines that the speech information may be used associated with a navigation service, the at least one travel means may include walking, riding a bicycle, taking a bus, taking a subway, taking a taxi, or the like, or a combination thereof. The distance parameter may be determined based on the probability distribution data related to different distance information corresponding to each of the at least one travel means. The distance parameter corresponding to a travel means may be positively correlated to the probability of using the travel means to travel the road distance between the start location and the destination. For instance, when the road distance is 1.5 Km, the probability of waking for 1.5 Km may be 0.3, the probability of riding a bicycle for 1.5 Km may be 0.5, and the probability of taking a taxi may be 0.2. The distance parameter corresponding to waking, riding a bicycle and taking a taxi may be determined based on 0.3, 0.5, and 0.2, respectively. The distance parameter corresponding to riding a bicycle for 1.5 Km may be higher than the distance parameters corresponding to waking and taking a taxi.

In 790, the speech recognition device 400 (e.g., the result determination module 430) may determine the updating coefficient based on at least one of the search parameter, the popularity parameter, the preference parameter, or the distance parameter. For example, the speech recognition device 400 may determine the updating coefficient based on an average or a weighted average, a sum or a weighted sum, a product, or a combination thereof, of the at least one parameter. Other methods of determining the updating coefficient based on the at least one parameter may also be implemented, which are within the protection scope of the present disclosure. Details regarding the determination of the updating coefficient may be found elsewhere in the present disclosure, for example, in the description of operation 650 in FIG. 6.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 8:
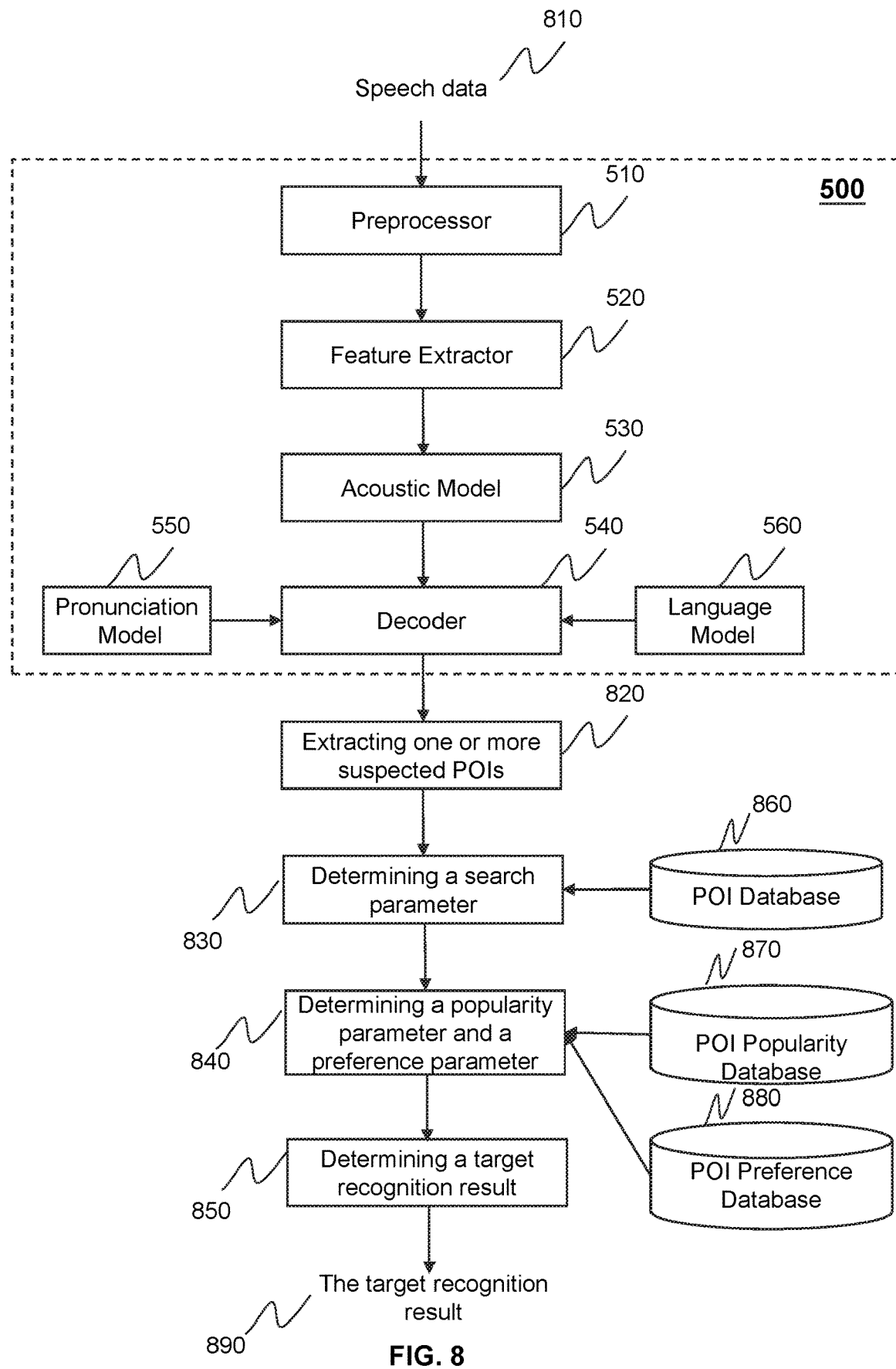
FIG. 8 is a schematic diagram illustrating an exemplary process for speech recognition according to some embodiments of the present disclosure.

FIG. 8 is a schematic diagram illustrating an exemplary process for speech recognition according to some embodiments of the present disclosure. Merely by way of example, the speech data 810 may be used for transportation services. The extracted keywords from the candidate recognition results may be related to locations (e.g., start locations or destinations) and are referred to as suspected POIs. In some embodiments, the speech recognition device 400 may obtain the speech data 810 from a user terminal (e.g., a user terminal 130, a terminal device 300). The speech recognition device 400 may recognize the speech data 810 based on a recognition model 500 to generate a plurality of candidate recognition results and corresponding preliminary scores. Such method of recognizing the speech data 810 may be found in, for example, FIG. 5 and FIG. 6.

In 820, the speech recognition device 400 may extract one or more suspected POIs from each of the plurality of candidate recognition results based on the predetermined keyword extracting rule. The speech recognition device 400 may evaluate the accuracy of each of the plurality of candidate recognition results by comparing the suspected POI (i.e., the extracted keywords) with sample POIs (i.e., the sample keywords) in one or more databases, such as a POI database 860, a POI popularity database 870, a POI preference database 880, or the like.

In 830, the speech recognition device 400 may determine a search parameter for each of the plurality of candidate recognition results according to a matching degree between the suspected POI and the sample POIs in the POI database 860. The POI database 860 may include a plurality of sample POIs. Each of the sample POIs may include at least one description corresponding to a location (e.g., geographical coordinates). The description may include a name, an address, or the like, or a combination thereof. The speech recognition device 400 may select one or more target sample POIs from the sample POIs, wherein the one or more matching degrees between the one or more target sample POIs and the suspected POI is higher than the first matching degree threshold. The search parameter may be determined based on the matching degree(s) between the target sample POI(s) and the suspected POI.

In 840, the speech recognition device 400 may determine a popularity parameter and a preference parameter based on the suspected POI. For instance, the popularity parameter may be determined according to the popularity information corresponding to the target sample POI in the POI popularity database 870. The POI popularity database 870 may include popularity information corresponding to each of the plurality of sample POIs. The preference parameter may be obtained according to the popularity information corresponding to the target sample POI in the POI preference database 880. The POI preference database may include preference information corresponding to each of the sample POIs associated with the current user who provided the speech information.

In 850, the speech recognition device 400 may determine a target recognition result 890 based on the search parameter, the popularity parameter, and the preference parameter. Since both of the popularity parameter and the preference parameter may indicate usage information of the suspected POI, one of the popularity parameter and the preference parameter that has a higher value may be selected. The speech recognition device 400 may determine an updating coefficient corresponding to the candidate recognition result based on the search parameter and the parameter that has the higher value between the popularity parameter and the preference parameter. The score of the candidate recognition result may be updated based on the updating coefficient to generate the updated score of the candidate recognition result. The target recognition result 890 may be selected based on the updated scores. For example, the candidate recognition result corresponding to the highest updated score may be determined as the target recognition result 890.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, one or more of the POI database 860, the POI popularity database 870, and the POI preference database 880 may be integrated into one database.

Figure 9:
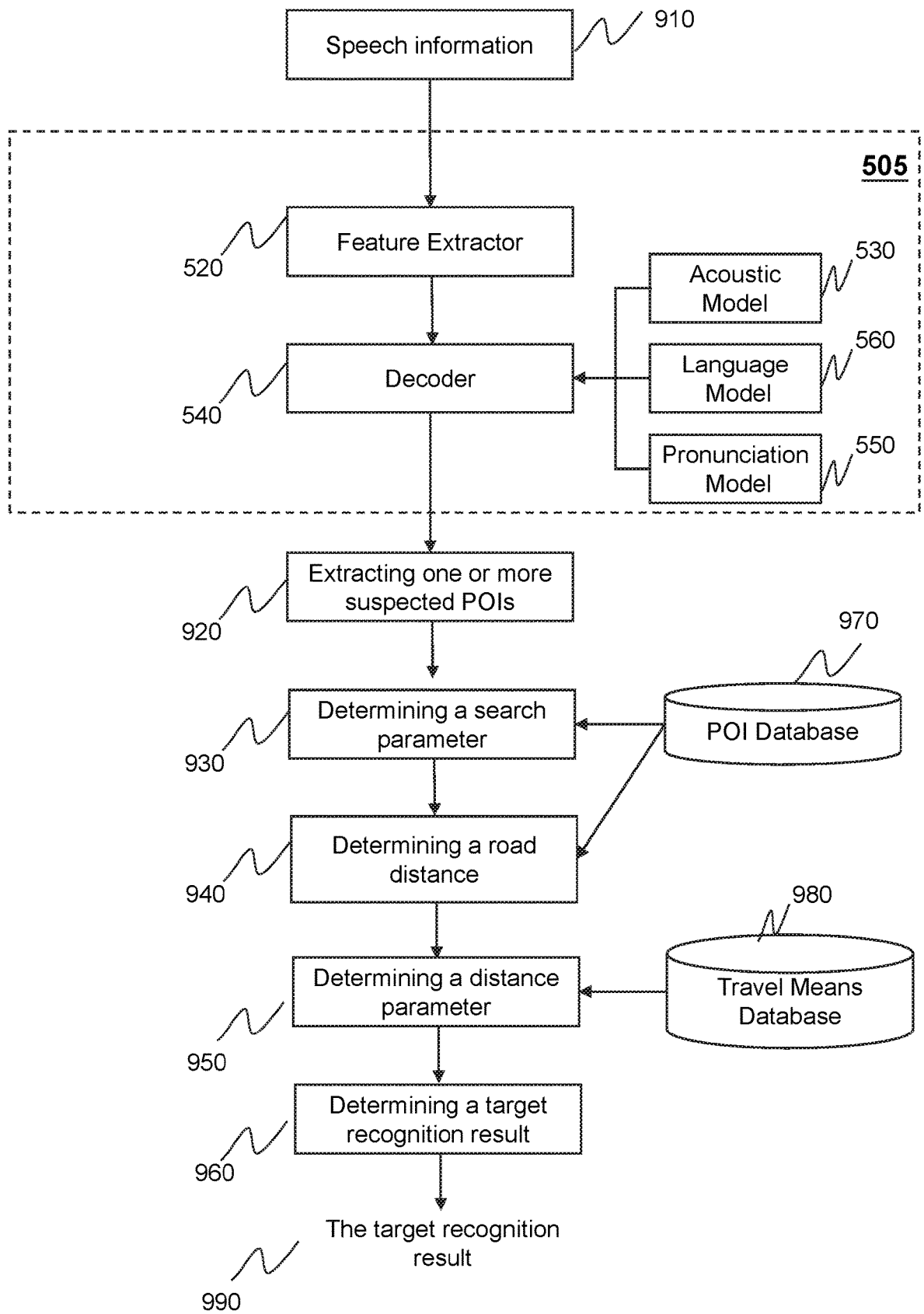
FIG. 9 is a schematic diagram illustrating an exemplary process for speech recognition according to some embodiments of the present disclosure.

FIG. 9 is a schematic diagram illustrating an exemplary process for speech recognition according to some embodiments of the present disclosure. Merely by way of example, the speech information 910 may be used for transportation services. The extracted keywords from the candidate recognition results may relate to locations (e.g., start locations or destinations) and are referred to as suspected POIs. In some embodiments, the speech recognition device 400 may obtain the speech information 910 from a user terminal (e.g., a user terminal 130, a terminal device 300). The speech recognition device 400 may recognize the speech information 910 based on a recognition model 500 to generate a plurality of candidate recognition results and corresponding preliminary scores. Such method of recognizing the speech information 910 may be found in e.g., FIG. 5 and FIG. 6.

In 920, the speech recognition device 400 may extract one or more suspected POIs. In some embodiments, n suspected POIs may be obtained. The speech recognition device 400 may determine the updating coefficient by comparing the suspected POI with sample POIs in one or more databases, such as a POI database 970, a travel means database 980, or the like.

In 930, the speech recognition device 400 may determine a search parameter for each of the plurality of candidate recognition results according to a matching degree between the one or more suspected POI and the sample POIs in the POI database 970. The POI database 970 may include a plurality of sample POIs. The sample POIs corresponding to matching degrees that are higher than a first matching degree threshold may be determined as the target sample POIs. In some embodiments, the preliminary score of each suspected POI may be updated based on the search parameter. For example, the updated preliminary score corresponding to a candidate recognition result may be expressed as $f(x, s)$, where $f$ is a function for determining the updated preliminary score based on the search parameter, x may denote the preliminary score corresponding to the candidate recognition result, and s may denote the search parameter corresponding to the candidate recognition result. For instance, the updated preliminary score may be obtained by multiplying the preliminary score by the search parameter, which may be expressed as $f(x, s)=xs$.

In 940, the speech recognition device 400 may determine a road distance. The road distance may be determined based on the GPS information of the start location and the destination. The start location and the destination may be determined based on the sample POIs matching with the one or more suspected POIs and the location type of the suspected POIs (e.g., whether it's a start location or a destination), as described, for example, in operation 780 of FIG. 7. If no suspected POI of the start location type is extracted from the candidate recognition result, the positioning information of the user terminal may be determined by the GPS. If no suspected POI of the destination type is extracted, a prompt message may be transmitted to the user terminal to notify the user that the speech information may not be recognized or have insufficient information to, for example, generate a service request or voice command. In some embodiments, if the suspected POI is fully matched with a target sample POI in the POI database (i.e., the matching degree is 1), the location information of the target sample POI is directly extracted for the determination of the start location or the destination. In some embodiments, M target sample POIs may be ranked in a descending order based on the matching degrees corresponding to the target sample POIs. The speech recognition device 400 may determine an average location based on the GPS information corresponding to M target sample POIs as the start location or the destination. In some embodiments, the speech recognition device 400 may obtain at least one travel means that is possible to be adopted by the user who provided the speech information via the user terminal. In some embodiments, the road distance corresponding to each of the at least one travel means may be determined.

In 950, the speech recognition device 400 may determine a distance parameter. The distance parameter may be determined according to probability distribution data related to different distance information (e.g., different road distances) corresponding to each of the plurality of travel means in the travel database. A probability corresponding to the road distance determined in operation 940 may be determined for each of the at least one travel means, and determined as or converted to the distance parameter. In some embodiments, the updated score of each candidate recognition result may be expressed as g{F, p [dist (a, b), D]}, where F may denote the updated preliminary score determined based on the search parameter, a may denote the start location, b may denote the destination, dist may denote a function for determining the road distance between two locations, D may denote the probability distribution data related to different road distances, p may be a function for determining the target probability corresponding to the road distances, and g may be a function for determining the updated score based on the updated preliminary score and the distance parameter. In some embodiments, the speech recognition device 400 may determine an updating coefficient based on the search parameter and the distance parameter. The preliminary score may be updated using the updating coefficient to generate the updated score.

In 960, the speech recognition device 400 may determine a target recognition result 990. In some embodiments, each candidate recognition result may correspond to at least one updated score associated with the at least one travel means. For example, the speech recognition device 400 may compare all the updated scores and determine the candidate recognition result corresponding to the highest updated score as the target recognition result. In some embodiments, the target recognition result and information related to the target recognition result may be transmitted to the user terminal 130 or the processing engine 112. The information related to the target recognition result may include one or more target sample keywords and/or a travel means corresponding to the target recognition result. The one or more target samples (e.g., a start location, a destination) may be used for a subsequent operation, such as generating a service request. The travel means corresponding to the target recognition result may be determined as a recommended travel means for the user. Merely by way of example, the service request may be a request for an online car-hailing service. The service request may be transmitted to a user terminal associated with a service provide (e.g., a driver).

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Figure 10:
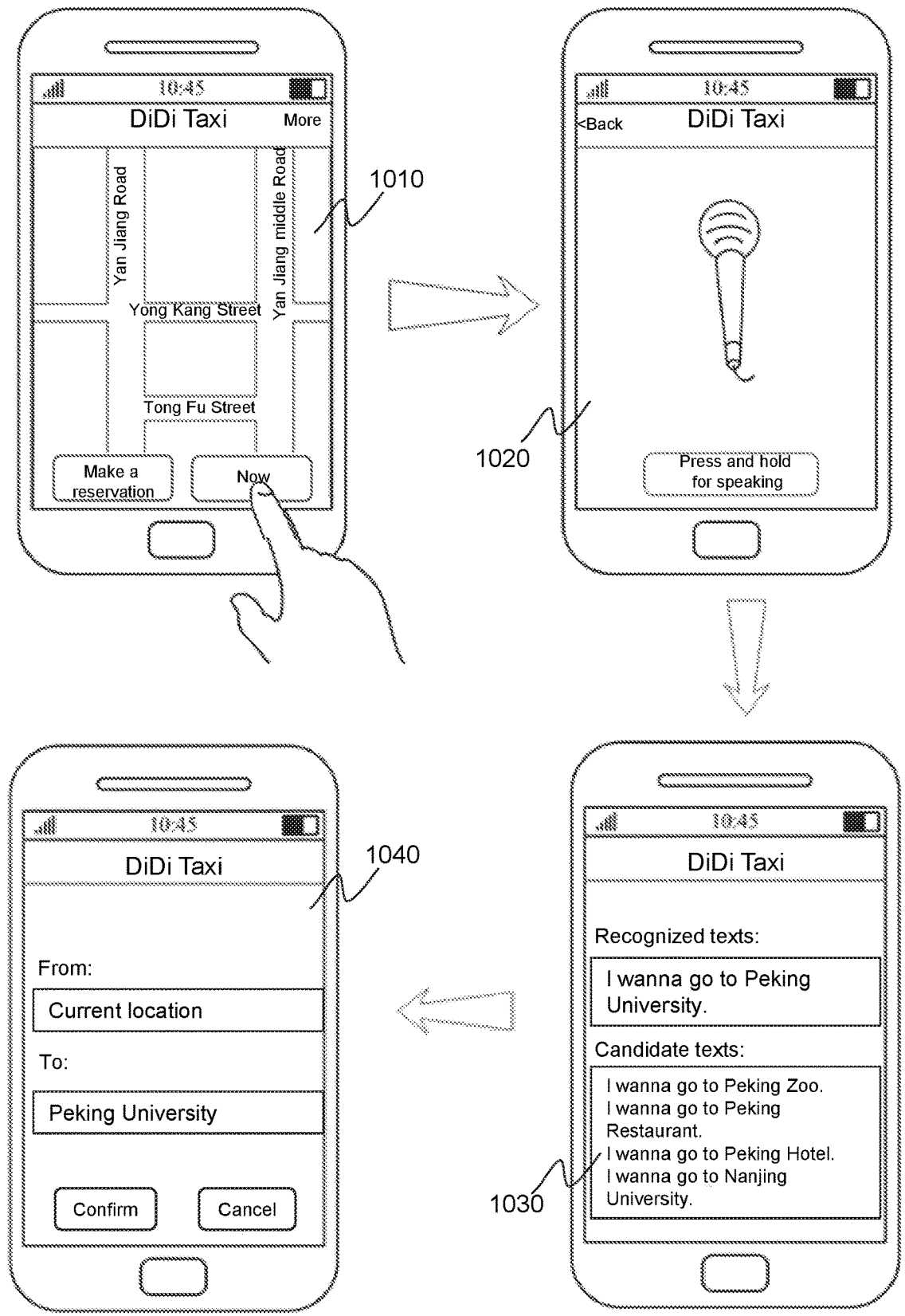
FIG. 10 is a schematic diagram illustrating an exemplary interfaces for generating a service request based on speech information according to some embodiments of the present disclosure.

FIG. 10 is a schematic diagram illustrating exemplary interfaces for generating a service request based on the speech information according to some embodiments of the present disclosure. The interfaces 1010-1040 in FIG. 10 are exemplary interfaces associated with an online car-hailing service. For example, the online car-hailing service may be provided by a car-hailing service App such as "DiDi Taxi".

When the user aims for requesting a service request via the user terminal (e.g., a user terminal 130, a terminal device 300) the user terminal may obtain a current location of the user terminal using a positioning technology, such as the GPS and display a map around the current location of the user terminal on the display of the user terminal as shown in interface 1010. The names of a plurality of streets may be shown on the interface 1010, such as "Tong Fu Street", "Yong Kang Street", etc. The DiDi Taxi App may provide two options for the user, i.e., to make a service request now, or to reserve for a future service request. For example, the user may tap on the icon with the text "Now" to make a service request.

After clicking "Now" in the interface 1010, interface 1020 may be displayed on the screen of the user terminal. A microphone icon is shown to indicate that the user may speak to provide the required information. An icon with the text "Press and hold for speaking" is shown in the interface 1020. The user may press and hold the button icon for speaking, and the microphone of the user terminal may acquire the speech information. Additionally, or alternatively, the user may press and hold the button(s) on the terminal device for speaking, such as a home button, a volume button, or any combination thereof. For instance, the user may say, "I wanna go to Peking University". The microphone may stop acquiring the speech information when the user releases the icon or when a preset time length of recording is reached. After the speech information is acquired, the user terminal may perform a speech recognition operation. Alternatively, the user terminal may transmit the speech information to a server (e.g., the server 110 in FIG. 1) and the server may perform the speech recognition operation. A plurality of candidate recognition results may be generated based on the speech information and a target recognition result may be selected from the plurality of candidate recognition results. Such methods may be found in e.g., FIGS. 6-8. If the speech recognition operation is performed by the server, a number of candidate recognition results and/or the target recognition result may be transmitted to the user terminal are being recognized.

In the interface 1030, a target recognition result "I wanna go to Peking University" is displayed under the text "Recognized texts:" A list of four candidate recognition results (e.g., "I wanna go to Peking Zoo", etc.) are displayed in the interface 1030 under the text "Candidate texts:". The user may confirm the recognized text or choose a candidate text from the list, for example, by tapping on the recognized text or the selected candidate text. If the recognized text and the candidate texts are inaccurate, the user may edit the recognized text or the candidate texts. Alternatively, the user may record the words again to update the recognized texts.

After the recognized text is confirmed, the user terminal may generate a service request in the interface 1040. The start location and the destination for the service request may be displayed on the screen. For example, the start location may be determined based on the positioning information of the user terminal. The destination may be the sample keyword of the destination type corresponding to the target recognition result. In the interface 1040, the start location is displayed as "the current location" under the text "From:", and the destination is displayed as "Peking University" under the text "To:". The user may also modify the start location and/or the destination if required. The user may tap on the "Confirm" icon to confirm the service request. The user may otherwise tap on the "Cancel" icon to cancel the service request. If the user confirms the service request, the service request may be initiated and transmitted to a service provider (e.g., a driver).

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, the contents displayed on the interfaces of the user terminal may be different from the interfaces 1010-1040.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A method implemented on a computing device having at least one storage device storing a set of instructions for speech recognition, a data exchange port communicatively connected to a network, and at least one processor in communication with the at least one storage device and the data exchange port, the method comprising:
  obtaining a plurality of candidate recognition results of speech information uttered by a user and a plurality of preliminary scores corresponding to the plurality of candidate recognition results, respectively;
  for each of the plurality of candidate recognition results, extracting one or more keywords from the candidate recognition result;
    obtaining a plurality of sample keywords from a database via the data exchange port;
    for each of the one or more extracted keywords,
      determining a matching degree between each of the one or more extracted keywords and each of the plurality of sample keywords; and
    determining one or more target sample keywords from the plurality of sample keywords, wherein the matching degree between the each of the one or more target sample keywords and the extracted keyword is higher than a matching degree threshold; and determining at least one parameter associated with the one or more extracted keywords based on the one or more target sample keywords;

generating an updating coefficient based on the at least one parameter; and updating the preliminary score based on the updating coefficient to generate an updated score; and determining, from the plurality of candidate recognition results, a target recognition result based on the plurality of updated scores.

2. The method of claim 1, wherein the at least one parameter includes a search parameter, and the determining the at least one parameter associated with the one or more extracted keywords based on the one or more target sample keywords includes:

determining the search parameter based on the matching degrees between the one or more target sample keywords and one or more extracted keywords.

3. The method of claim 1, wherein the at least one parameter includes a popularity parameter, and the determining the at least one parameter associated with the one or more extracted keywords based on the one or more target sample keywords includes:

obtaining popularity degrees of the one or more target sample keywords; and determining the popularity parameter based on the popularity degrees of the one or more target sample keywords.

4. The method of claim 1, wherein the at least one parameter includes a preference parameter, and the determining the at least one parameter associated with the one or more extracted keywords based on the one or more target sample keywords includes:

obtaining preference degrees of the user with respect to the one or more target sample keywords; and determining the preference parameter based on the preference degrees of the one or more target sample keywords.

5. The method of claim 1, wherein the at least one parameter includes a distance parameter, the determining the at least one parameter associated with the one or more extracted keywords based on the one or more target sample keywords includes:

obtaining location information associated with the one or more target sample keywords;

identifying one or more location type indicating words in the candidate recognition result;

for each of the one or more extracted keywords that is immediately after the one or more identified location type indicating words, determining a location type of the extracted keyword based on the corresponding location type indicating word;

determining distance information associated with the one or more extracted keywords based on the location information associated with the one or more target sample keywords and the location type of each of the one or more extracted keywords; and determining the distance parameter based on the distance information.

6. The method of claim 5, further comprising:

obtaining a first number of travels corresponding to the distance information associated with each of at least one travel means in a statistical time period;

determining a second number of travels corresponding to the distance information associated with all of the at least one travel means in the statistical time period;

for each of the at least one travel means, determining a probability of using the travel means based on the first number of travels and the second number of travels;

obtaining a travel means associated with the speech information; and determining the distance parameter based on the probability of using the travel means associated with the speech information.

7. The method of claim 1, wherein the at least one parameter includes at least one of a popularity parameter, a preference parameter, a search parameter, or a distance parameter, and the generating an updating coefficient based on the at least one parameter includes:

generating the updating coefficient based on the popularity parameter, the preference parameter and the search parameter; or generating the updating coefficient based on the distance parameter and the search parameter.

8. The method of claim 1, wherein the target recognition result includes a start location or a destination, and the method further includes:

generating a service request based on the target recognition result.

9. The method of claim 8, further comprising:

transmitting the service request to a user terminal associated with a service provider.

10. A system for speech recognition, comprising:

at least one storage device including a set of instructions;

a data exchange port communicatively connected to a network; and at least one processor in communication with the at least one storage device and the data exchange port, wherein the at least one processor is configured to execute the set of instructions and directed to cause the system to:

obtain a plurality of candidate recognition results of speech information uttered by a user and a plurality of preliminary scores corresponding to the plurality of candidate recognition results, respectively;

for each of the plurality of candidate recognition results, extract one or more keywords from the candidate recognition result;

obtain a plurality of sample keywords from a database via the data exchange port;

for each of the one or more extracted keywords, determine a matching degree between each of the one or more extracted keywords and each of the plurality of sample keywords; and determine one or more target sample keywords from the plurality of sample keywords, wherein the matching degree between the each of the one or more target sample keywords and the extracted keyword is higher than a matching degree threshold; and determine at least one parameter associated with the one or more extracted keywords based on the one or more target sample keywords;

generate an updating coefficient based on the at least one parameter; and update the preliminary score based on the updating coefficient to generate an updated score; and determine, from the plurality of candidate recognition results, a target recognition result based on the plurality of updated scores.

11. The system of claim 10, wherein the at least one parameter includes a search parameter, and to determine the at least one parameter associated with the one or more extracted keywords based on the one or more target sample keywords, the at least one processor is further directed to cause the system to:
   determine the search parameter based on the matching degrees between the one or more target sample keywords and one or more extracted keywords.

12. The system of claim 10, wherein the at least one parameter includes a popularity parameter, and to determine the at least one parameter associated with the one or more extracted keywords based on the one or more target sample keywords, the at least one processor is further directed to cause the system to:
   obtain popularity degrees of the one or more target sample keywords; and
   determine the popularity parameter based on the popularity degrees of the one or more target sample keywords.

13. The system of claim 10, wherein the at least one parameter includes a preference parameter, and to determine the at least one parameter associated with the one or more extracted keywords based on the one or more target sample keywords, the at least one processor is further directed to cause the system to:
   obtain preference degrees of the user with respect to the one or more target sample keywords; and
   determine the preference parameter based on the preference degrees of the one or more target sample keywords.

14. The system of claim 10, wherein the at least one parameter includes a distance parameter, and to determine the at least one parameter associated with the one or more extracted keywords based on the one or more target sample keywords, the at least one processor is further directed to cause the system to:
   obtain location information associated with the one or more target sample keywords;
   identify one or more location type indicating words in the candidate recognition result;
   for each of the one or more extracted keywords that is immediately after the one or more identified location type indicating words, determine a location type of the extracted keyword based on the corresponding location type indicating word;
   determine distance information associated with the one or more extracted keywords based on the location information associated with the one or more target sample keywords and the location type of each of the one or more extracted keywords; and
   determine the distance parameter based on the distance information.

15. The system of claim 14, wherein the at least one processor is further directed to cause the system to:
   obtain a first number of travels corresponding to the distance information associated with each of at least one travel means in a statistical time period;
   determine a second number of travels corresponding to the distance information associated with all of the at least one travel means in the statistical time period;
   for each of the at least one travel means, determine a probability of using the travel means based on the first number of travels and the second number of travels;
   obtain a travel means associated with the speech information; and
   determine the distance parameter based on the probability of using the travel means associated with the speech information.

16. The system of claim 10, wherein the at least one parameter includes at least one of a popularity parameter, a preference parameter, a search parameter, or a distance parameter, and to generate an updating coefficient based on the at least one parameter, the at least one processor is further directed to cause the system to:
   generate the updating coefficient based on the popularity parameter, the preference parameter and the search parameter; or
   generate the updating coefficient based on the distance parameter and the search parameter.

17. The system of claim 10, wherein the target recognition result includes a start location or a destination, and the at least one processor is further directed to cause the system to:
   generate a service request based on the target recognition result.

18. The system of claim 17, wherein the at least one processor is further directed to cause the system to:
   transmit the service request to a user terminal associated with a service provider.

19. A non-transitory computer readable medium, comprising a set of instructions for speech recognition, wherein when executed by at least one processor, the set of instructions directs the at least one processor to effectuate a method, the method comprising:
   obtaining a plurality of candidate recognition results of speech information uttered by a user and a plurality of preliminary scores corresponding to the plurality of candidate recognition results, respectively;
   for each of the plurality of candidate recognition results, extracting one or more keywords from the candidate recognition result;
   obtaining a plurality of sample keywords from a database via the data exchange port;
   for each of the one or more extracted keywords,
      determining a matching degree between each of the one or more extracted keywords and each of the plurality of sample keywords; and
      determining one or more target sample keywords from the plurality of sample keywords, wherein the matching degree between the each of the one or more target sample keywords and the extracted keyword is higher than a matching degree threshold; and
   determining at least one parameter associated with the one or more extracted keywords based on the one or more target sample keywords;
   generating an updating coefficient based on the at least one parameter; and
   updating the preliminary score based on the updating coefficient to generate an updated score; and
   determining, from the plurality of candidate recognition results, a target recognition result based on the plurality of updated scores.

* * * * *